(12) United States Patent
Mirrashidi et al.

(10) Patent No.: US 7,860,830 B2
(45) Date of Patent: Dec. 28, 2010

(54) PUBLISHING, BROWSING AND PURCHASING OF GROUPS OF MEDIA ITEMS

(75) Inventors: Payam Mirrashidi, San Francisco, CA (US); Ellis M. Verosub, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 695 days.

(21) Appl. No.: 11/115,090

(22) Filed: Apr. 25, 2005

(65) Prior Publication Data

US 2005/0278377 A1 Dec. 15, 2005

(51) Int. Cl.
*G06F 17/30* (2006.01)

(52) U.S. Cl. ...................................... 707/626

(58) Field of Classification Search ............ 707/1, 707/2, 7, 104.1, 10, 626; 705/51; 84/609
See application file for complete search history.

(56) References Cited

U.S. PATENT DOCUMENTS

| | | | |
|---|---|---|---|
| 3,990,710 A | 11/1976 | Hughes | |
| 4,528,643 A | 7/1985 | Freeny, Jr. | |
| 4,851,931 A | 7/1989 | Parker et al. | |
| 5,168,481 A | 12/1992 | Culbertson et al. | |
| 5,181,107 A | 1/1993 | Rhoades | |
| 5,191,573 A | 3/1993 | Hair | |
| 5,341,350 A | 8/1994 | Frank et al. | |
| 5,355,302 A | 10/1994 | Martin et al. | |
| 5,418,713 A | 5/1995 | Allen | |
| 5,428,735 A | 6/1995 | Kahl et al. | |
| 5,481,509 A | 1/1996 | Knowles | |
| 5,504,852 A | 4/1996 | Thompson-Rohrlich | |
| 5,559,945 A | 9/1996 | Beaudet et al. | |
| 5,561,604 A | 10/1996 | Buckley et al. | |
| 5,566,353 A | 10/1996 | Cho et al. | |
| 5,583,993 A | 12/1996 | Foster et al. | |
| 5,587,404 A | 12/1996 | Kroner et al. | |
| 5,616,876 A * | 4/1997 | Cluts ......................... | 84/609 |
| 5,633,839 A | 5/1997 | Alexander et al. | |
| 5,640,566 A | 6/1997 | Victor et al. | |
| 5,666,530 A | 9/1997 | Clark et al. | |
| 5,710,922 A | 1/1998 | Alley et al. | |
| 5,714,971 A | 2/1998 | Shalit et al. | |

(Continued)

FOREIGN PATENT DOCUMENTS

EP 0 917 077 5/1999

(Continued)

OTHER PUBLICATIONS

"Apple Announces iTunes 2," Press Release, Apple Computer, Inc., Oct. 23, 2001.

(Continued)

*Primary Examiner*—Etienne P LeRoux

(57) ABSTRACT

Improved techniques to create, browse and/or purchase media asset groups are disclosed. Media assets groups can be created by various persons and published to a digital assets manager. Thereafter, the media assets groups can be finalized and made available for on-line purchase. Once the media asset groups are made available for on-line purchase, users can browse and/or purchase the media asset groups at an on-line media store. One example of a media asset group (group of media items) is known as a playlist, which can pertain to a group of audio tracks.

37 Claims, 17 Drawing Sheets

U.S. PATENT DOCUMENTS

| | | |
|---|---|---|
| 5,721,949 A | 2/1998 | Smith et al. |
| 5,726,909 A | 3/1998 | Krikorian |
| 5,727,202 A | 3/1998 | Kucala |
| 5,734,823 A | 3/1998 | Saigh et al. |
| 5,739,451 A | 4/1998 | Winksy et al. |
| 5,740,134 A | 4/1998 | Peterson |
| 5,819,160 A | 10/1998 | Foladare et al. |
| 5,835,721 A | 11/1998 | Donahue et al. |
| 5,835,732 A | 11/1998 | Kikinis et al. |
| 5,845,282 A | 12/1998 | Alley et al. |
| 5,864,868 A | 1/1999 | Contois |
| 5,875,110 A | 2/1999 | Jacobs |
| 5,897,642 A | 4/1999 | Capossela et al. |
| 5,918,213 A | 6/1999 | Bernard et al. |
| 5,918,303 A | 6/1999 | Yamaura et al. |
| 5,923,757 A | 7/1999 | Hocker et al. |
| 5,925,843 A | 7/1999 | Miller et al. |
| 5,963,916 A | 10/1999 | Kaplan |
| 5,969,283 A | 10/1999 | Looney et al. |
| 5,983,069 A | 11/1999 | Cho et al. |
| 5,995,098 A * | 11/1999 | Okada et al. .............. 715/752 |
| 6,000,000 A | 12/1999 | Hawkins et al. |
| 6,006,274 A | 12/1999 | Hawkins et al. |
| 6,038,199 A | 3/2000 | Pawlowski et al. |
| 6,041,023 A | 3/2000 | Lakhansingh |
| 6,052,797 A | 4/2000 | Ofek et al. |
| 6,061,306 A | 5/2000 | Buchheim |
| 6,125,369 A | 9/2000 | Wu et al. |
| 6,172,948 B1 | 1/2001 | Keller et al. |
| 6,208,044 B1 | 3/2001 | Viswanadham et al. |
| 6,216,131 B1 | 4/2001 | Liu et al. |
| 6,243,328 B1 | 6/2001 | Fenner et al. |
| 6,243,725 B1 | 6/2001 | Hempleman et al. |
| 6,247,135 B1 | 6/2001 | Feague |
| 6,248,946 B1 * | 6/2001 | Dwek ........................ 84/609 |
| 6,255,961 B1 | 7/2001 | Van Ryzin et al. |
| 6,272,545 B1 | 8/2001 | Flanagin et al. |
| 6,283,764 B2 | 9/2001 | Kajiyama et al. |
| 6,295,541 B1 | 9/2001 | Bodnar et al. |
| 6,332,175 B1 | 12/2001 | Birrell et al. |
| 6,341,316 B1 | 1/2002 | Kloba et al. |
| 6,356,971 B1 | 3/2002 | Katz et al. |
| 6,380,947 B1 | 4/2002 | Stead |
| 6,389,467 B1 | 5/2002 | Eyal |
| 6,407,750 B1 | 6/2002 | Gioscia et al. |
| 6,434,680 B2 | 8/2002 | Belknap et al. |
| 6,446,080 B1 | 9/2002 | Van Ryzin et al. |
| 6,452,609 B1 | 9/2002 | Katinsky et al. |
| 6,453,281 B1 | 9/2002 | Walters et al. |
| 6,490,432 B1 | 12/2002 | Wegener et al. |
| 6,493,758 B1 | 12/2002 | McLain |
| 6,523,124 B1 | 2/2003 | Lunsford et al. |
| 6,529,804 B1 | 3/2003 | Draggon et al. |
| 6,563,769 B1 | 5/2003 | Van Der Meulen |
| 6,587,403 B1 | 7/2003 | Keller et al. |
| 6,587,404 B1 | 7/2003 | Keller et al. |
| 6,621,768 B1 | 9/2003 | Keller et al. |
| 6,636,873 B1 | 10/2003 | Carini et al. |
| 6,664,981 B2 | 12/2003 | Ashe et al. |
| 6,665,803 B2 | 12/2003 | Lunsford et al. |
| 6,718,348 B1 | 4/2004 | Novak et al. |
| 6,721,489 B1 | 4/2004 | Benyamin et al. |
| 6,731,312 B2 | 5/2004 | Robbin |
| 6,760,721 B1 | 7/2004 | Chasen et al. |
| 6,763,345 B1 | 7/2004 | Hempleman et al. |
| 6,779,019 B1 | 8/2004 | Mousseau et al. |
| 6,785,542 B1 | 8/2004 | Blight et al. |
| 6,794,566 B2 | 9/2004 | Pachet |
| 6,801,964 B1 | 10/2004 | Mahdavi |
| 6,874,037 B1 | 3/2005 | Abram et al. |
| 6,928,433 B2 | 8/2005 | Goodman et al. |
| 6,933,433 B1 * | 8/2005 | Porteus et al. ............. 84/615 |
| 6,941,324 B2 | 9/2005 | Plastina et al. |
| 6,978,127 B1 | 12/2005 | Bulthuis et al. |
| 6,987,221 B2 | 1/2006 | Platt |
| 7,043,477 B2 * | 5/2006 | Mercer et al. .............. 707/7 |
| 7,055,165 B2 | 5/2006 | Connelly |
| 7,111,009 B1 | 9/2006 | Gupta et al. |
| 7,117,516 B2 | 10/2006 | Khoo et al. |
| 7,126,770 B1 | 10/2006 | Arai et al. |
| 7,209,633 B1 | 4/2007 | Novak et al. |
| 7,228,298 B1 | 6/2007 | Raines |
| 2001/0004310 A1 | 6/2001 | Kono |
| 2001/0011308 A1 | 8/2001 | Clark et al. |
| 2001/0021053 A1 | 9/2001 | Colbourne et al. |
| 2001/0041021 A1 | 11/2001 | Boyle et al. |
| 2001/0044835 A1 | 11/2001 | Schober et al. |
| 2001/0048642 A1 | 12/2001 | Berhan |
| 2001/0052123 A1 | 12/2001 | Kawai |
| 2002/0002413 A1 | 1/2002 | Tokue |
| 2002/0010788 A1 | 1/2002 | Nathan et al. |
| 2002/0013784 A1 | 1/2002 | Swanson |
| 2002/0016968 A1 | 2/2002 | Nathan et al. |
| 2002/0046315 A1 | 4/2002 | Miller et al. |
| 2002/0055934 A1 | 5/2002 | Lipscomb et al. |
| 2002/0073167 A1 | 6/2002 | Powell et al. |
| 2002/0080180 A1 | 6/2002 | Mander et al. |
| 2002/0116082 A1 | 8/2002 | Gudorf |
| 2002/0118300 A1 | 8/2002 | Middleton et al. |
| 2002/0133515 A1 | 9/2002 | Kagle et al. |
| 2002/0138606 A1 | 9/2002 | Robison |
| 2002/0161865 A1 | 10/2002 | Nguyen |
| 2002/0174269 A1 | 11/2002 | Spurgat et al. |
| 2002/0194309 A1 | 12/2002 | Carter et al. |
| 2003/0013493 A1 | 1/2003 | Irimajiri et al. |
| 2003/0014767 A1 | 1/2003 | Stumphauzer |
| 2003/0030733 A1 | 2/2003 | Seaman et al. |
| 2003/0037254 A1 | 2/2003 | Fischer et al. |
| 2003/0046434 A1 | 3/2003 | Flanagin et al. |
| 2003/0050058 A1 | 3/2003 | Walsh et al. |
| 2003/0055723 A1 | 3/2003 | English |
| 2003/0074457 A1 | 4/2003 | Kluth |
| 2003/0079038 A1 | 4/2003 | Robbin et al. |
| 2003/0093340 A1 | 5/2003 | Krystek et al. |
| 2003/0098893 A1 | 5/2003 | Makinen |
| 2003/0112279 A1 | 6/2003 | Irimajiri |
| 2003/0149628 A1 * | 8/2003 | Abbosh et al. ............. 705/16 |
| 2003/0167318 A1 | 9/2003 | Robbin et al. |
| 2003/0182315 A1 | 9/2003 | Plastina et al. |
| 2003/0191756 A1 | 10/2003 | Oh |
| 2003/0206203 A1 | 11/2003 | Ly |
| 2003/0210821 A1 | 11/2003 | Yogeshwar et al. |
| 2003/0221541 A1 | 12/2003 | Platt |
| 2004/0001395 A1 | 1/2004 | Keller et al. |
| 2004/0001396 A1 | 1/2004 | Keller et al. |
| 2004/0017997 A1 | 1/2004 | Cowgill |
| 2004/0027930 A1 | 2/2004 | Kudo |
| 2004/0055446 A1 | 3/2004 | Robbin et al. |
| 2004/0076086 A1 | 4/2004 | Keller |
| 2004/0083480 A1 | 4/2004 | Dodge |
| 2004/0093274 A1 * | 5/2004 | Vanska et al. ............. 705/26 |
| 2004/0103102 A1 | 5/2004 | Nelson |
| 2004/0113915 A1 * | 6/2004 | Ohtsuki et al. ............. 345/582 |
| 2004/0123725 A1 | 7/2004 | Kim |
| 2004/0128277 A1 | 7/2004 | Mander et al. |
| 2004/0139180 A1 | 7/2004 | White et al. |
| 2004/0148358 A1 | 7/2004 | Singh et al. |
| 2004/0205028 A1 * | 10/2004 | Verosub et al. ............. 705/59 |
| 2004/0225762 A1 | 11/2004 | Poo |
| 2004/0261064 A1 | 12/2004 | Goldstein et al. |
| 2005/0055718 A1 * | 3/2005 | Stone ........................ 725/61 |
| 2005/0060264 A1 * | 3/2005 | Schrock et al. ............. 705/51 |
| 2005/0080915 A1 | 4/2005 | Shoemaker |
| 2005/0149392 A1 | 7/2005 | Gold et al. |

| | | | |
|---|---|---|---|
| 2005/0235015 | A1 | 10/2005 | Abanami et al. |
| 2005/0240494 | A1 | 10/2005 | Cue et al. |
| 2005/0240661 | A1 | 10/2005 | Heller et al. |
| 2005/0249080 | A1 | 11/2005 | Foote et al. |
| 2005/0262528 | A1 | 11/2005 | Herley |
| 2005/0267803 | A1 | 12/2005 | Patel et al. |
| 2006/0036567 | A1 | 2/2006 | Tan |
| 2006/0100978 | A1 | 5/2006 | Heller et al. |
| 2006/0163358 | A1 | 7/2006 | Biderman |
| 2006/0168340 | A1 | 7/2006 | Heller et al. |
| 2008/0256378 | A1 | 10/2008 | Guillorit |

FOREIGN PATENT DOCUMENTS

| | | |
|---|---|---|
| EP | 0 982 732 | 3/2000 |
| EP | 1 028 425 | 8/2000 |
| JP | 2000-339917 | 12/2000 |
| JP | 2001-93226 | 4/2001 |
| JP | 2001-117800 | 4/2001 |
| WO | WO 01/33569 | 6/1995 |
| WO | WO 95/16950 | 6/1995 |
| WO | WO 01/67753 | 9/2001 |
| WO | WO 02/25610 | 3/2002 |
| WO | WO 03/023786 | 3/2003 |
| WO | WO 2004/084413 | 9/2004 |
| WO | 2005073856 A2 | 8/2005 |

OTHER PUBLICATIONS

"Apple Introduces iTunes—World's Best and Easiest To Use Jukebox Software," Macworld Expo, San Francisco, Jan. 9, 2001.
"Apple's iPod Available in Stores Tomorrow," Press Release, Apple Computer, Inc., Nov. 9, 2001.
"Hewlett Packard Jornada 525 Color Pocket PC," downloaded Jan. 25, 2002, http://www.pc4d.com/electronics/products/56/jornada_525_color_pocket_pc.shtml.
"Nomad Jukebox," User Guide, Creative Technology Ltd., Version 1, Aug. 2000.
"Replay Gain—A proposed Standard," Oct. 7, 2001, from http://replaygain.hydrogenaudio.org/index.html and http://replaygain.hydrogenaudio.org/outline.html.
"SoundJam MP Plus Manual, version 2.0"—MP3 Player and Encoder for Macintosh by Jeffrey Robbin, Bill Kincaid and Dave Heller, manual by Tom Negrino, published by Casady & Greene, Inc., 2000.
"About MusicMatch Jukebox," MusicMatch Jukebox v4 Help, pp. 1-4.
"iTunes Celebrates Its First Anniversary; Over 70 Million Songs Purchased," Apr. 28, 2004, http://www.apple.com/pr/library/2004/apr/28itunes.html.
"Rio Portable Music Player," Independent Web Review, downloaded Jan. 25, 2002, http://www.webreviews.com/9901/rio.html.
Birrell, Andrew, "Personal Jukebox (PJB)," Oct. 13, 2000, http://birrell.org/andrew/talks/pjb-overview.ppt.
Breen, Christopher, "iMixing it Up: Sharing Your Sounds," Sep. 17, 2004, http://playlistmag.com/help/2004/09/imixhowto/index.php.
Bridgman, "Windows XP Expert Zone Community Columist", Using Windows Mobil-based Portable Media Centers and Windows Media Player 10, Aug. 25, 2004, 1-11.
Butler, Travis, "Archos Jukebox 6000 Challenges Nomad Jukebox," Aug. 13, 2001, http://db.tidbits.com/getbits.acgi?tbart=06521.
Butler, Travis, "Portable MP3: The Nomad Jukebox," Jan. 8, 2001, http://db.tidbits.com/getbits.acgi?tbart=06261.
Chakarova et al., "Digital Still Cameras—Downloading Images to a Computer," Multi-Media Reporting and Convergence, 2 pgs.
Compaq Computer Corp., copyright 1991, Personal Jukebox User Manual, pp. 1-29.
Compaq, "Personal Jukebox," Jan. 24, 2001, http://research.compaq.com/SRC/pjb/.
De Herrera, Chris, "Microsoft ActiveSync 3.1," Version 1.02, Oct. 13, 2000.
Engst, Adam C., "SoundJam Keeps on Jammin'," Jun. 19, 2000, http://db.tidbits.com/getbits.acgi?tbart=05988.
Fleishman, Glenn, "Handheld iPod joins MP3 band a bit late, but is standout player," Nov. 6, 2001, http://seattletimes.nwsource.com/html/businesstechnology/134361811_ptmacc040.html.
Handbook for Palm™ m500 Series Handhelds, User Manual.
IEEE 1394—Wikipedia, 1995, http://www.wikipedia.org/wiki/Firewire.
iTunes 2, Playlist Related Help Screens, iTunes v2.0, Apple Computer, Inc., Oct. 23, 2001.
iTunes, Digital Music for your Mac, Apple Computer, Inc., downloaded Oct. 22, 2001, http://www.apple.com/itunes/.
iTunes, Playlist Related Help Screens, iTunes v1.0, Apple Computer, Inc., Jan. 2001.
Kawamoto et al., "On $1^{st}$ Birthday, iTunes Unwraps New Features," Apr. 28, 2004, http://news.com.com/On+1st+birthday,+iTunes+unwraps+new+features/2100-1027_3-5201598.html.
Lindauer, Andy, "What's in your Pocket?," Edgereview, downloaded Jan. 25, 2002, http://www.edgereview.com/print.cfm?Type=aag&ID=286.
Lyra, Personal Digital Player, RCA, Product Box.
Miniman, "Applian Software's Replay Radio and Player v1.02," Product review, pocketnow.com, http://www.pocketnow.com/reviews/replay/replay.htm, Jul. 31, 2001.
Musicmatch, "Musicmatch and Xing Technology Introduce Musicmatch Jukebox," May 18, 1998, http://www.musicmatch.com/info/company/press/releases/?year=1998&release=2.
RCA Lyra User's Guide, RD2201/2202/2204, www.lyrazone.com, pp. 1-37.
RealJukebox Plus Manual, Real Networks, Inc., copyright 1999, pp. 1-83.
RealJukebox, Real Networks, Inc., webpages downloaded Oct. 27, 2005 http://www.real.com/Jukebox/release_notes.html#.
Sinitsyn, "A Synchronization Framework for Personal Mobile Servers," Proceedings of the Second IEEE Annual Conference on Pervasive Computing and Communications Workshops, Piscataway, NJ, Mar. 14, 2004, pp. 1-4.
SoundJam MP Plus, Representative Screens, published by Casady & Greene, Inc., Salinas, CA, 2000.
Specification Sheet, iTunes 2, Apple Computer, Inc., Oct. 31, 2001.
Steinberg, "Sonicblue Rio Car," Product Review, Dec. 12, 2000, http://electronics.cnet.com/electronics/0-6342420-1304-4098389.html.
TuneBase 100 User Guide, A CD Library Management System, Escient, Inc. copyright 1999.
TuneBase Pro Mk-II User's Guide, Escient, Inc.
U.S. Appl. No. 10/198,639, filed Jul. 16, 2002.
U.S. Appl. No. 10/833,399, filed Apr. 27, 2004.
U.S. Appl. No. 10/833,879, filed Apr. 27, 2004.
U.S. Appl. No. 10/936,233, filed Sep. 7, 2004.
U.S. Appl. No. 10/973,925, filed Oct. 25, 2004.
U.S. Appl. No. 11/097,034, filed Apr. 1, 2005.
U.S. Appl. No. 11/097,591, filed Apr. 1, 2005.
U.S. Appl. No. 11/138,004, filed May 25, 2005.
U.S. Appl. No. 11/114,914, filed Apr. 25, 2005.
U.S. Appl. No. 11/454,060, filed Jun. 14, 2006.
Vetro et al., "Media Conversions to Support Mobile Users," IEEE Canadian Conference on Electrical and Computer Engineering, Piscataway, NJ, May 13, 2001, pp. 607-612.
Window's Media Player 6.4, Microsoft Corp., copyright 1999, software available at http://www.oldversion.com/program.php?n=wmp See also Windows Media Player 6.4 Software Official website at http://www.microsoft.com/windows/windowsmedia/player/version64/default.aspx.
Zheng et al., "MobiGATE: a mobile gateway proxy for the active deployment of transport entities," Proceedings of the 2004 International Conference on Parallel Processing, Piscataway, NJ, Aug. 15, 2004.
PBS Local Insertion Server Instruction Manual, Microvision, Inc., pp. 1-71, Jun. 19, 1996.
Wave Station Digital Audio Automation System, Instruction & Operations Manual Broadcast Software International, pp. 1-113, Feb. 4, 1997.

Nielsen et al., "Comparative Design Review: An Exercise in Parallel Design", INTERCHI '93, pp. 414-417 Apr. 24-29, 1993.

Lowery Daryl, "Random-Access Digital Audio—Recording Systems", pp. 68-71, Jun. 1992.

Sadie Master System, Product Brochure, Studio audio Digital Equipment Inc., 2 pgs.

RCS Works-Cart Wall User's Guide and Reference Manual, pp. 1-83, Feb. 7, 1993.

"Digital Audio Just Got Easier!", CartWorks Digital Audio Systems, dbm Systems, Inc.

"CartWorks File Utilities User's Manual", dbm Systems, Inc., pp. 1-8.

"CartWorks MHD Music-on-Hard-Drive QuickSchedule User's Manual", dbm Systems, Inc., pp. 1-8, Feb. 8, 1998.

"CartWorks MHD Music-on-Hard-Drive User's Manual V6.8", dbm Systems, Inc., pp. 1-11.

"CartWorks On-Demand Editor User's Manual", dbm Systems, Inc., pp. 1-7.

"CartWorks Script Editor User's Manual v3.12", dbm Systems, Inc., pp. 1-26.

"CartWorks Spot Set Editor User's Manual", dbm Systems, Inc., pp. 1-11.

"The DADpro Digital Audio Delivery System Operation Manual Version 1.0", IBM Corp., pp. 1-424, Aug. 30, 1996.

"Virtual Recorder—Basic Operations", ASC Audio Video Corporation, pp. 1-94, Sep. 9, 1996.

"Broadcast Tools: SpotBase, Playlist & TapeBase", ASC Audio Video Corporation, pp. 1-2.

"VR 300 Advanced Broadcast Video Server", ASC Audio Video Corporation, pp. 1-9.

"VR300 Video Server User Manual, Version 1.0", ASC Audio Video Corporation, pp. 1-40, Mar. 20, 1998.

"Gravis WinDecks Version 1.12", screen shots, Gravis Computer Technology Ltd., pp. 1-10.

WinDecks, User Instructions, Gravis Computer Technology Ltd., pp. 1-14.

Iriver, "PMP140/120", Sep. 13, 2004, 1-2 pgs.

MG-25, Portable MPEG4 Player (MG-25), Jul. 29, 2004, 1-3 pgs.

Windows XP Service Pack 2, Figures 1-2 and "How to obtain the latest Windows XP service pack," Aug. 25, 2004.

Mabini. MemMaid Review. Pocket PC Dubai, Jul. 23, 2004[online], [retrieved on Mar. 26, 2008]. Retrieved from the Internew <URL: http://www.pocketpcdubai.com/DinarSoft/memmaid_review.html>.

Torrone, Phillip, How-To: Getting Podcasts on a Portable Media Center (and other Windows Media Devices, Oct. 2004.

* cited by examiner

PUBLISHING, BROWSING AND PURCHASING OF GROUPS OF MEDIA ITEMS

CROSS-REFERENCE TO RELATED APPLICATIONS

This application is related to U.S. patent application Ser. No. 10/833,879, filed Apr. 27, 2004, and entitled "METHOD AND SYSTEM FOR SHARING PLAYLISTS", which is hereby incorporated by reference herein.

This application is also related to (i) U.S. patent application Ser. No. 11/114,914, filed concurrently herewith, and entitled "PUBLISHING, BROWSING, RATING AND PURCHASING OF GROUPS OF MEDIA ITEMS"; (ii) U.S. application Ser. No. 11/097,034, filed Apr. 1, 2005, and entitled "PERSISTENT GROUP OF MEDIA ITEMS FOR A MEDIA DEVICE", which is hereby incorporated herein by reference; (iii) U.S. patent application Ser. No. 11/078,583, filed Mar. 11, 2005, and entitled "AUTOMATED CREATION OF MEDIA ASSET ILLUSTRATION COLLAGE"; (iv) U.S. patent application Ser. No. 10/833,399, filed Apr. 27, 2004, and entitled "METHOD AND SYSTEM FOR CONFIGURABLE AUTOMATIC MEDIA SELECTION", which is hereby incorporated by reference herein; (v) U.S. patent application Ser. No. 10/832,984, filed Apr. 26, 2004, and entitled "GRAPHICAL USER INTERFACE FOR BROWSING, SEARCHING AND PRESENTING MEDIA ITEMS"; (vi) U.S. Provisional Patent Application Ser. No. 60/622,280, filed Oct. 25, 2004, and entitled "ONLINE PURCHASE OF DIGITAL MEDIA BUNDLES"; (vii) U.S. Provisional Patent Application Ser. No. 60/620,223, filed Oct. 18, 2004, and entitled "NETWORK-BASED PURCHASE AND DISTRIBUTION OF DIGITAL MEDIA ITEMS", all of which are hereby incorporated by reference herein; (viii) U.S. patent application Ser. No. 10/832,812, filed Apr. 26, 2004, and entitled "METHOD AND SYSTEM FOR SECURE NETWORK-BASED DISTRIBUTION OF CONTENT"; (ix) U.S. patent Application Ser. No. 10/833,267, filed Apr. 26, 2004, and entitled "METHOD AND SYSTEM FOR NETWORK-BASED PURCHASE AND DISTRIBUTION OF MEDIA"; (x) U.S. patent application Ser. No. 10/277,418, filed Oct. 21, 2002, and entitled "INTELLIGENT INTERACTION BETWEEN MEDIA PLAYER AND HOST COMPUTER", which is hereby incorporated herein by reference; and (xi) U.S. patent application Ser. No. 10/198,639, filed Jul. 16, 2002, and entitled "METHOD AND SYSTEM FOR UPDATING PLAYLISTS", which is hereby incorporated by reference herein.

BACKGROUND OF THE INVENTION

1. Field of the Invention

The present invention relates to media asset groups and, more particularly, to publishing, browsing and purchasing media asset groups.

2. Description of the Related Art

A media player stores media assets, such as audio tracks, that can be played or displayed on the media player. One example of a media player is the iPod® media player, which is available from Apple Computer, Inc. of Cupertino, Calif. Often, a media player acquires its media assets from a host computer that serves to enable a user to manage media assets. In managing media assets, a user can create playlists for audio tracks. These playlists can be created at the host computer with the help of a media management application. Media assets within the playlists can then be copied to the media player. As an example, the host computer can execute a media management application to manage media assets. One example of a media management application is iTunes® produced by Apple Computer, Inc.

Typically, at a host computer, a user would create a playlist for their own personal use using a media management application. However, the grouping of the various media assets within the playlist can be useful to other users. Indeed, if the users that are performing the grouping are well-known or noteworthy, there may be particular interest in sharing such playlists. One difficulty with sharing playlists is that the media assets within the playlist can originate from a wide variety of different sources. As a result, given that a playlist does not include the songs or audio tracks themselves, the recipient of the playlist needs to have access to the identified songs or audio tracks in order to re-create the playlist on their own media management application (e.g., host computer). Another difficultly with sharing playlists is that, although on-line music stores provide users of media management application with the ability to purchase songs or albums, playlists are themselves not saleable groupings of media assets, at least not according to the recording industry.

Thus, there is a need for improved techniques to facilitate sharing and purchasing of playlists.

SUMMARY OF THE INVENTION

The invention pertains to improved techniques to create, browse and/or purchase media asset groups. Media assets groups can be created by various persons and published to a digital assets manager. Thereafter, the media assets groups can be finalized and made available for on-line purchase. Once the media asset groups are made available for on-line purchase, users can browse and/or purchase the media asset groups at an on-line media store. One example of a media asset group (group of media items) is known as a playlist, which can pertain to a group of audio tracks.

One aspect of the invention pertains to creation of media asset groups having media assets arranged in multiple sub-groups. Another aspect of the invention is the ability to process a created media asset group to ensure appropriate availability of each of the constituent media assets of the media asset group. Still another aspect of the invention pertains to presenting different sub-groups of a media asset group while browsing and/or purchasing via an on-line music store. Yet still another aspect of the invention is the ability to purchase constituent assets of a media asset group.

The invention can be implemented in numerous ways, including as a method, system, device, apparatus (including graphical user interface), or computer readable medium. Several embodiments of the invention are discussed below.

As a method for creating a group of media assets to be made available on an on-line media asset store, one embodiment of the invention includes at least the acts of: interacting, at a client, with the on-line media asset store to create a particular group of media assets; interposing one or more sub-group indicators in the particular group of media assets to designate a plurality of sub-groups; providing, at the client, descriptive information for the particular group of media assets; and submitting the particular group of media assets with its descriptive information to be made available on the on-line media assets store.

As a method for processing a group of media assets to be made available on an on-line media asset store, one embodiment of the invention includes at least the acts of: receiving a group of media assets to be made available on the on-line media asset store; determining availability from the on-line media asset store of each of the media assets in the group of media assets; and removing, from the group of media assets, those of the media assets determined to not be available from the on-line media asset store.

As a graphical user interface for assisting a user to locate media assets of interest from an on-line media store, one embodiment of the graphical user interface includes at least: a window displayed on a display device associated with a computing device. The window concurrently includes at least a first sub-window and a second sub-window. The first sub-window displays information pertaining to a group of media assets. The second sub-window displays a list of at least a portion of the media assets in the group of media items.

As a graphical user interface for assisting a user in making a media asset group having a plurality of media assets available on an on-line media store, one embodiment of the graphical user interface includes at least a window displayed on a display device associated with a computing device. The window concurrently includes at least a first sub-window and a second sub-window. The first sub-window displays a plurality of user interface components that enable the user to enter information pertaining to the media asset group. The second sub-window displays a list of at least a portion of the media assets in the media asset group. In one implementation, the media asset group includes a plurality of sub-groups.

As a graphical user interface for assisting a user in making a media asset group having a plurality of media assets available on an on-line media store, another embodiment of the graphical user interface includes at least a window displayed on a display device associated with a computing device. The window is associated with making the media asset group which includes a plurality of sub-groups. The window includes at least a first region that displays a plurality of user interface components that enable a user to enter information for each of the sub-groups of the media asset group.

As a computer readable medium including at least computer program code for creating a group of media assets to be made available on an on-line media asset store, one embodiment of the invention includes at least: computer program code for interacting with the on-line media asset store to create a particular group of media assets; computer program code for interposing one or more sub-group indicators in the particular group of media assets to designate a plurality of sub-groups; computer program code for receiving descriptive information for the particular group of media assets; and computer program code for submitting the particular group of media assets with its descriptive information to be made available on the on-line media assets store.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which:

FIGS. 10A-10D are screen shots pertaining to a multi-group playlist display window according to one embodiment of the invention.

DETAILED DESCRIPTION OF THE INVENTION

The invention pertains to improved techniques to create, browse and/or purchase media asset groups. Media assets groups can be created by various persons and published to a digital assets manager. Thereafter, the media assets groups can be finalized and made available for on-line purchase. Once the media asset groups are made available for on-line purchase, users can browse and/or purchase the media asset groups at an on-line media store. One example of a media asset group (group of media items) is known as a playlist, which can pertain to a group of audio tracks. Note that the media asset group (e.g., playlist) identifies media assets that are within the media asset group, but does not include the media assets themselves.

One aspect of the invention pertains to creation of media asset groups having media assets arranged in multiple sub-groups. Another aspect of the invention is the ability to process a created media asset group to ensure appropriate availability of each of the constituent media assets of the media asset group. Still another aspect of the invention pertains to presenting different sub-groups of a media asset group while browsing and/or purchasing via an on-line music store. Yet still another aspect of the invention is the ability to purchase constituent assets of a media asset group.

Embodiments of the invention are discussed below with reference to FIGS. 1-10D. However, those skilled in the art will readily appreciate that the detailed description given herein with respect to these figures is for explanatory purposes as the invention extends beyond these limited embodiments.

Figure 1:
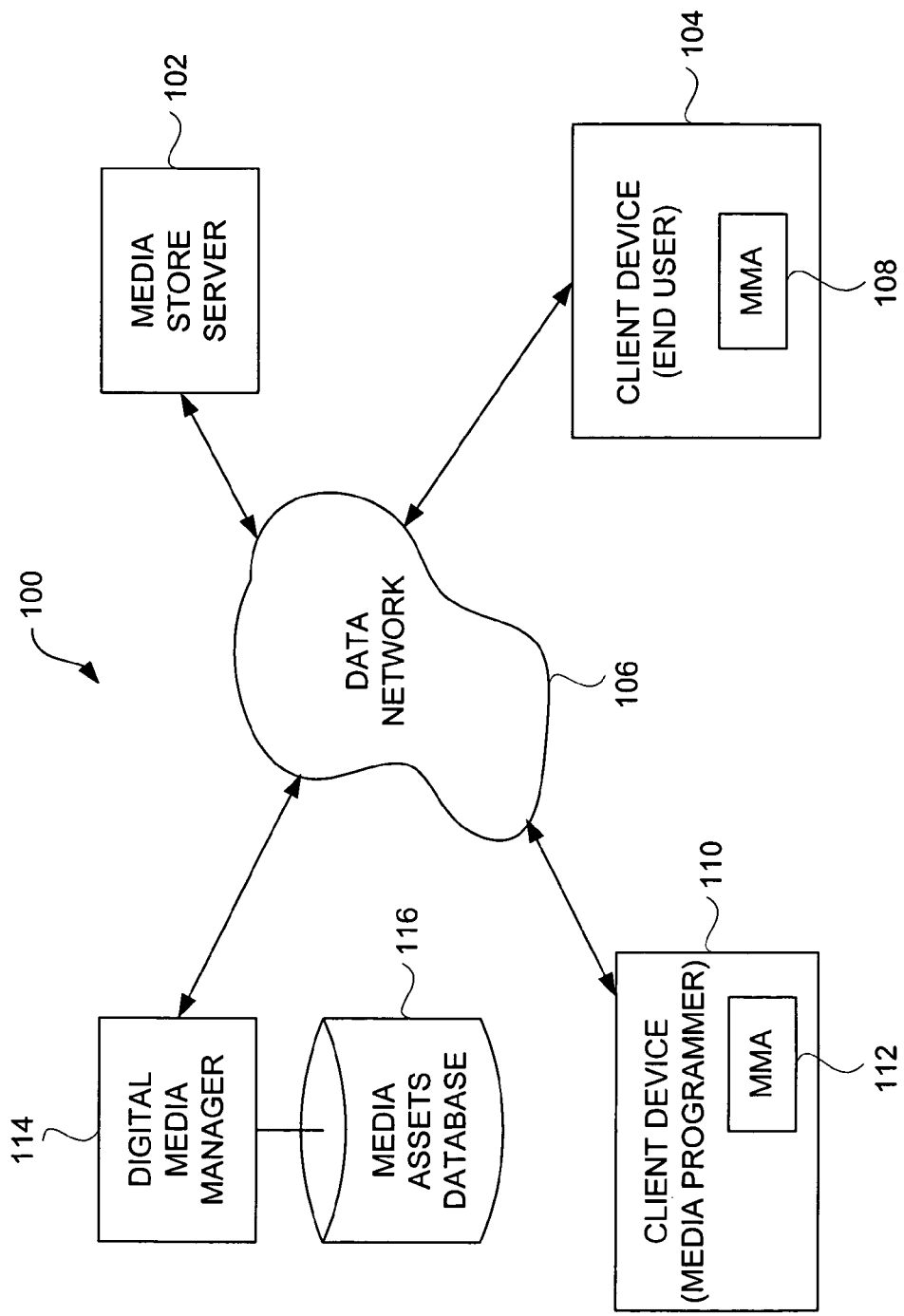
FIG. 1 is a block diagram of a multi-device media purchase system according to one embodiment of the invention.

FIG. 1 is a block diagram of a media purchase system 100 according to one embodiment of the invention. The media purchase system 100 includes a media store server 102 that hosts an on-line media store. The media store server 102 can off-load commerce transactions and/or delivery of purchased digital media assets to other servers, if desired. As shown in FIG. 1, the media purchase system 100 includes one or more client devices 104 for use by end users. The client devices 104 couple to a data network 106. Additionally, the media store server 102 also couples to the data network 106. In one implementation, the data network 106 can refer to one or more data networks, typically, high data-bandwidth networks, namely, wired networks, such as the Internet, Ethernet, gigabit Ethernet, and fiber optic, as well as wireless networks such as IEEE 802.11(a),(b) or (g) (WiFi), IEEE 802.16 (WiMax), and Ultra-Wide Band (UWB).

A computer program 108, typically a media management application (MMA) or other media player application, runs on the client device 104. One example of a media management application is the iTunes® application, produced by Apple Computer, Inc. of Cupertino, Calif. The client devices 104 are, in general, computing devices. As an example, the client devices 104 can be specific or general-purpose personal computers or portable media players. One example of a portable media player suitable for use with the invention is the iPod®, also produced by Apple Computer, Inc. The computer program 108 can be used by a consumer for a variety of purposes, including, but not limited to, browsing and/or purchasing media assets from the on-line media store provided by the media store server 102, creating and sharing media asset groups (e.g., playlists), organizing media assets, presenting/playing media assets, and transferring media assets between client devices 104.

The media purchase system 100 can also includes one or more client devices 110 for use by media programmers. The client devices 110 also run a computer program 112, typically a media management application (MMA) or other media player application. The computer program 112 can be the same as the computer program 108, though the computer program 112 might offer additional functionality for support of the media programmer. As an example, the media programmer uses the computer program 112 to create and share professionally design media asset groups (e.g., playlists).

The media purchase system 100 also includes a digital asset manager 114. The digital asset manager 114 is coupled to a media assets database 116. The media assets database 116 stores media asset information including metadata relating to digital media assets available for purchase at the on-line media store. The metadata can pertain to individual media assets (digital media assets) or media asset groups (digital media asset groups). Media assets can include, but are not limited to, music, video, text, and/or graphics files. In the case of music, a media asset group can be a playlist for the music. One specific example of a type of digital media asset group is referred to as an iMix™, which is a published playlist currently available for browsing and/or purchase on Apple Computer's iTunes® Music Store. Another specific example of a type of digital media asset group is referred to as an iEssential™, which is a published playlist created by a media programmer and currently available for browsing and/or purchase on Apple Computer's iTunes® Music Store. Still another specific example of a type of digital media asset group is referred to as a Celebrity Playlist, which is a published playlist created by a celebrity and which could be made available for browsing and/or purchase on Apple Computer's iTunes® Music Store.

The media store server 102 enables the user of a particular client device 104 to purchase media assets (e.g., songs, videos, albums). Subsequently, the client device 104 can download the purchased media assets from the media store server 102, or some other server, via the data network 106. As will be understood by those familiar with data networks, other network configurations are possible. Furthermore, while the media store server 102 and the digital asset manager 114 are shown as individual and separate devices, it will be understood by those familiar with the art that other configurations are possible. As one example, each device can be implemented such that it is distributed over multiple server computers. As another example, these various servers and/or managers can be implemented by a single physical server computer.

Figure 2:
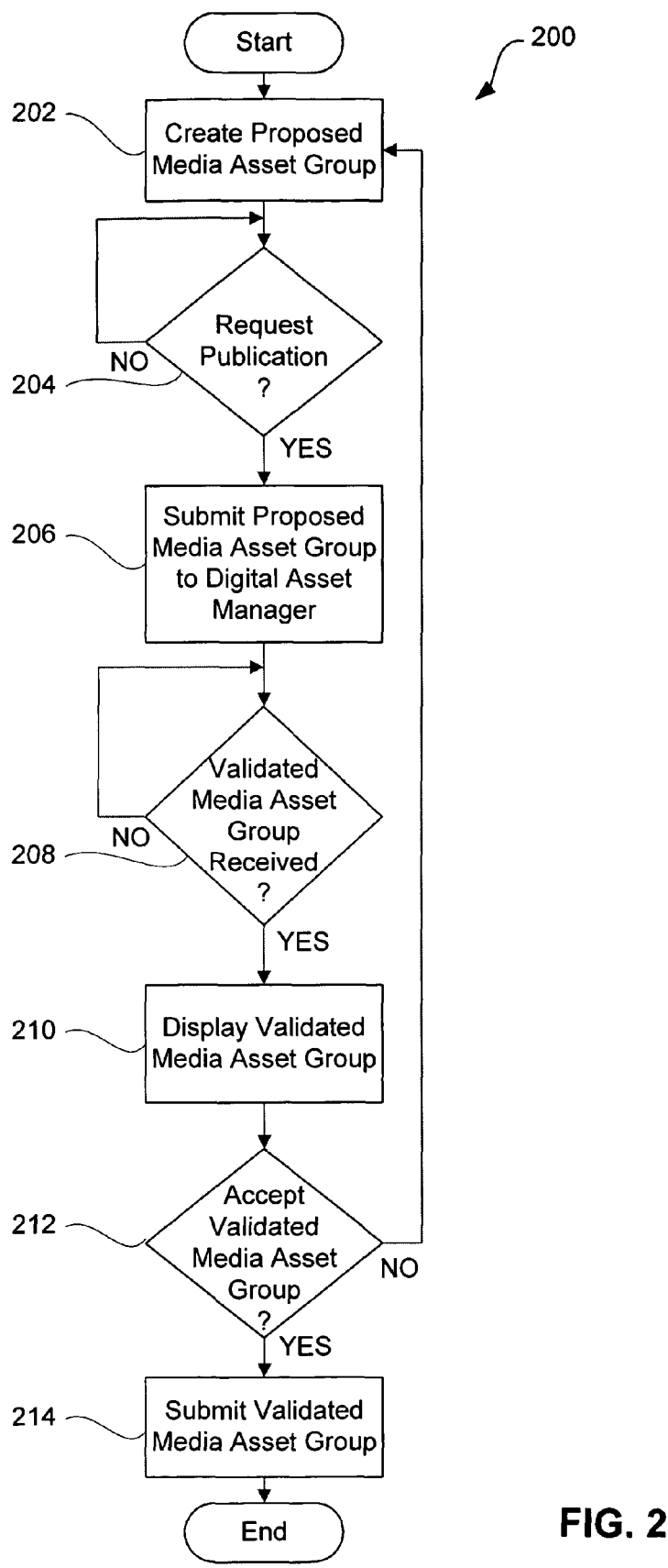
FIG. 2 is a flow diagram of a client-side media asset group publication process according to one embodiment of the invention.

FIG. 2 is a flow diagram of a client-side media asset group publication process 200 according to one embodiment of the invention. The client-side media asset group publication process 200 is performed, for example, at a client. For example, the client can refer to a media management application operating on a client computer. One example of a music management program is the iTunes® client application, produced by Apple Computer, Inc. of Cupertino, Calif. Eventually, media asset groups being processed by the client-side media asset group publication process 200 become available on an on-line media store. One example of an on-line media store is the iTunes® Music Store, operated by Apple Computer, Inc.

The client-side media asset group publication process 200 begins with creation 202 of a proposed media asset group (e.g., a playlist of songs). The proposed media asset group may be created manually by a user selecting individual media assets from a media asset source (e.g., an on-line media store or a library of music files), or generated automatically using specified criteria such as user ratings, artist name, or media genre. Next, a decision 204 determines if a publication request has been made. A publication request can be made, for example, by operating a "publish" control in a media management application (e.g., selecting a "publish" button).

If the decision 204 determines that a publication request has been made (by a submitter), then the proposed media asset group is submitted 206 to a digital media manager. The digital media manager can be, for example, the digital media manager 114 of FIG. 1. Next, a decision 208 determines if a validated media asset group has been received. Subsequently, once a validated media asset group has been received, the validated media asset group is displayed 210 for the submitter of the proposed media asset group. Typically, the validated media asset group serves to inform the submitter of the proposed media asset group which, if any, of the media assets in the proposed media asset group are available for purchase at a particular on-line media store.

Once the validated media asset group has been received, the submitter can be given the option to add or edit information (e.g., user comments) and/or illustrations (e.g., images) to be associated with the media asset group. In one embodiment, the validated media asset group includes a mosaic of media asset illustrations associated with one or more of the available media assets within the validated media asset group. Additionally, the validated media asset group can include instructions (e.g., XML or PostScript®) directing the requesting client to display the information or illustrations in a particular format.

Next, a decision 212 determines whether the validated media asset group has been accepted. The user (submitter), for example, may select an "accept" control in a media management application to indicate acceptance of the validated media asset group (e.g., selecting an "submit" or "accept" button). If the validated media asset group has been accepted, the validated media asset group is submitted 214 and the client-side media asset group publication process 200 ends. If, on the other hand, the decision 212 determines that the validated media asset group has not been accepted, then the client-side media asset group publication process 200 returns to repeat block 202 and subsequent blocks, thereby allowing the user (submitter) to create a new or modified proposed media asset group for publication.

Figure 3:
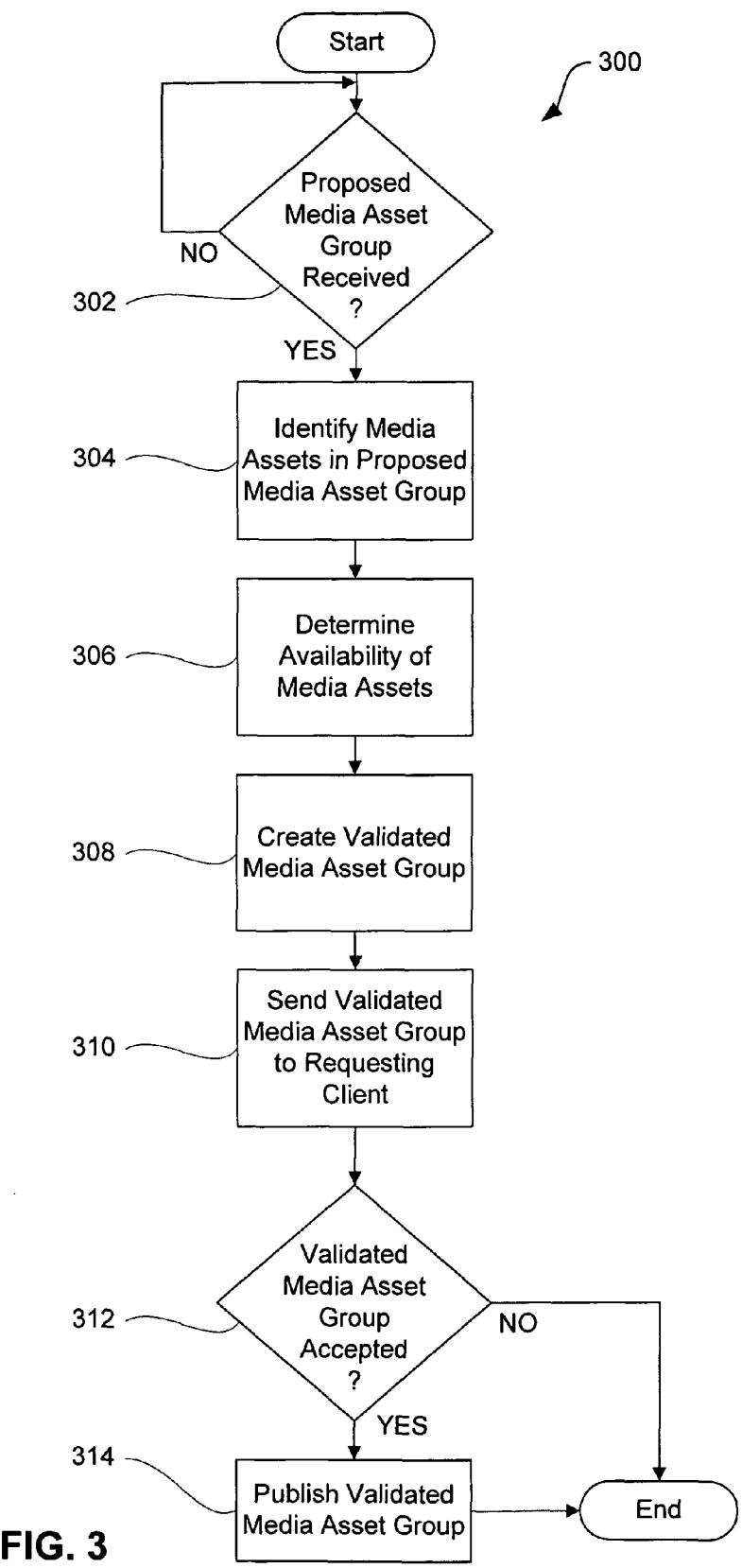
FIG. 3 is a flow diagram of a server-side media asset group publication process according to one embodiment of the invention.

FIG. 3 is a flow diagram of a server-side media asset group publication process 300 according to one embodiment of the invention. In one embodiment of the invention, the server-side media asset group publication process is performed using the digital asset manager of the media purchase system 100 of FIG. 1.

The server-side media asset group publication process 350 begins with a decision 302 that determines if a proposed media asset group has been received. The proposed media asset group can be a proposed media asset group as submitted 206 in FIG. 3. Next, the media assets in the proposed media assets are identified 304. This identification 304 can be performed by the digital asset manager 114 of FIG. 1. The identification 304 of the media assets can permit some leeway allowing for typographical errors or misidentifications of the media assets in the proposed media asset group (e.g., a title misspelling or improper artist attribution). In one implementation, the identification 304 is performed with the aid of a list of common misspellings and/or misattributions.

Next, the availability of the identified media assets in the proposed media asset group is determined 306. The determination 306 can be accomplished by checking whether the identified media assets are contained within list or database containing information about media assets that are available for purchase. In one implementation, the availability can depend on a particular on-line media store where the eventual media asset group is to be made available. For example, a particular media item might be available for purchase on a United States website for an on-line media store, but not a United Kingdom website for an on-line media store. As an example, the availability can be determined by interacting with the digital asset manager 114 of FIG. 1. Note that the availability of media assets can depend on a variety of factors. For example, one or more media assets may not be available in a particular country. It is also possible that one or more media assets in the media asset group may be temporarily or permanently unavailable due to corrupted or missing digital media files.

Once the availability of the media assets has been determined 306, a validated media asset group is created 308. The validated media asset group includes at least the media assets in the proposed media asset group that are available for purchase. In one implementation, the validated media asset group does not list the media assets in the media asset group that are unavailable. In another implementation, the unavailable media assets are shown, but designated as permanently or temporarily unavailable. In still another implementation, unavailable media assets that are expected to become available in the near future are displayed along with available media assets.

Next, the validated media asset group is sent 310 to the requesting client for approval. Besides the list of media assets, the validated media asset group can include one or more images, text, and/or layout information. In one implementation, the validated media asset group is sent along with instructions (e.g., XML, HTML, PostScript®) directing the requesting client to display the additional text and images in a particular layout using, for example, a media management application or web browser.

The server-side media asset group publication process 300 continues with a decision 312, which waits for acceptance of the validated media asset group. This acceptance can correspond to the acceptance as described above in reference to submission 214 operation of FIG. 2. If the decision determines 312 that the validated media asset group has been accepted, then the validated media asset group is published 314 and the server-side media asset group publication process 300 ends. In one implementation, the publication 314 makes the media assets in the validated media asset group available for purchase from an on-line media store. For example, an on-line media store might display the media assets in the validated media asset group as a compilation or collection in the on-line media store. Additionally, the on-line media store could further display text and/or illustrations pertaining to the validated media asset group. Examples of published media asset groups can be noted as iMixes™ or iEssentials™, which are available from the iTunes® Music Store.

Figure 4A:
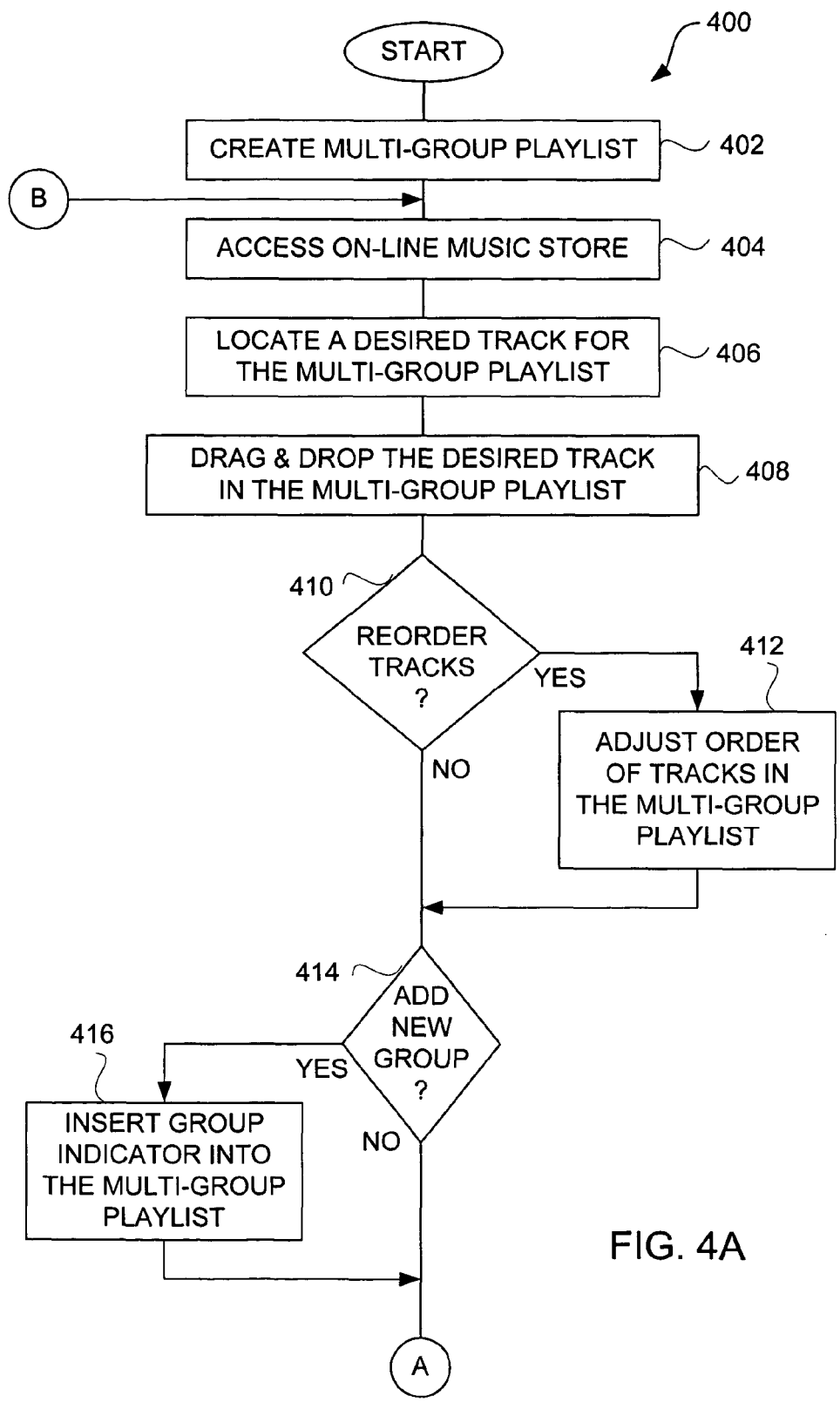
FIGS. 4A-4C are flow diagrams of a multi-group playlist submission process according to one embodiment of the invention.
Figure 4B:
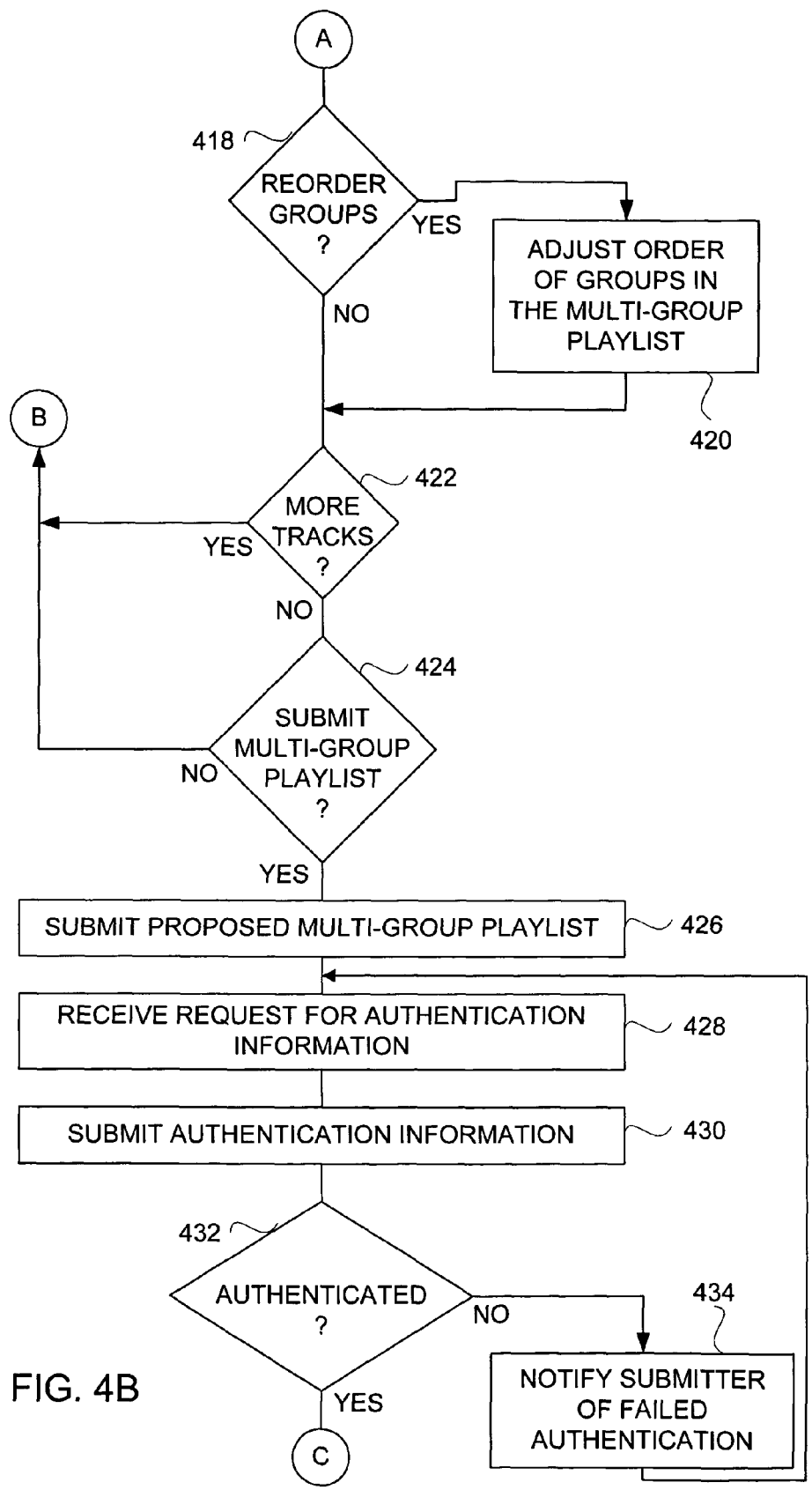
Figure 4C:
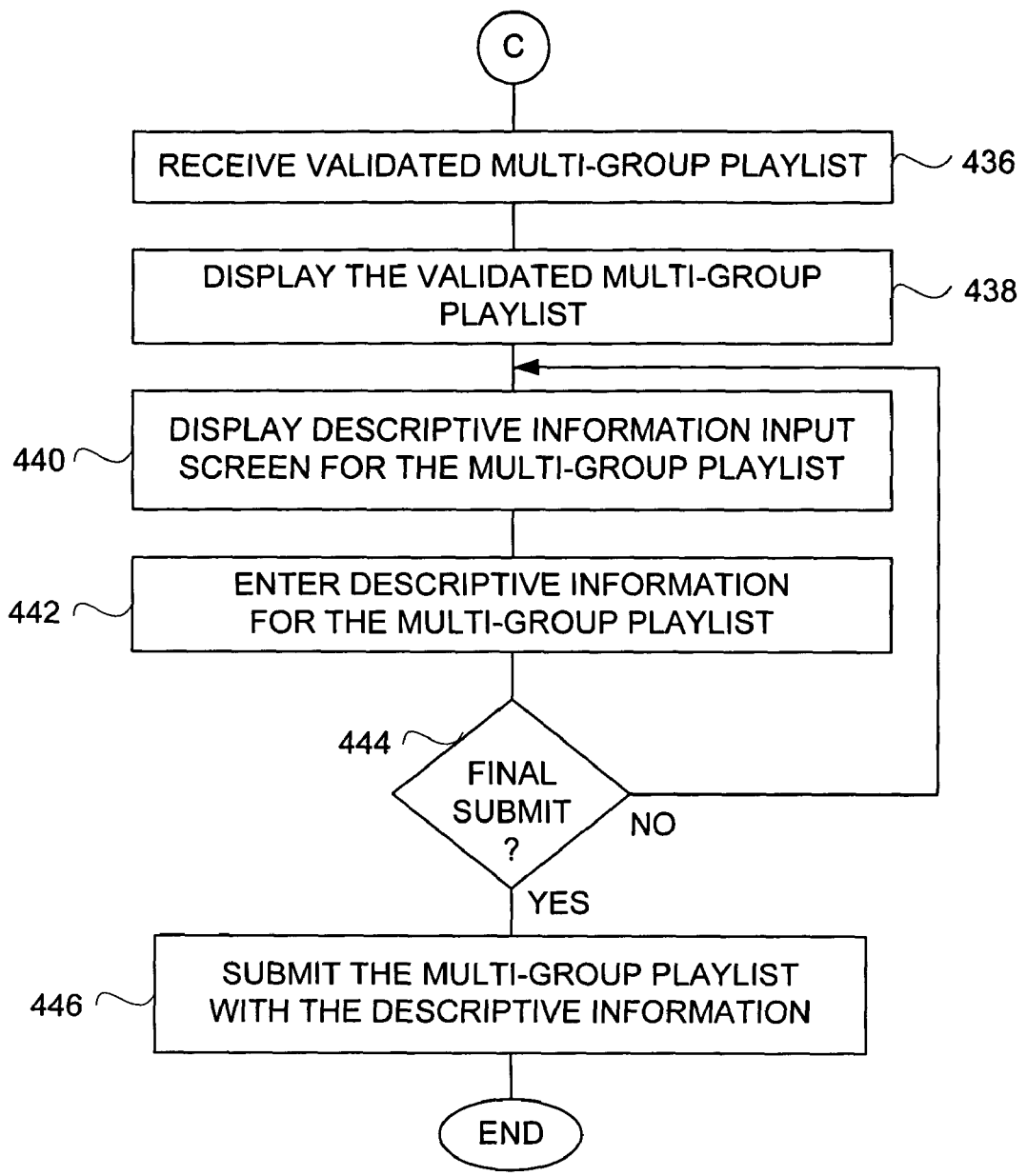

FIGS. 4A-4C are flow diagrams of a multi-group playlist submission process 400 according to one embodiment of the invention. The multi-group playlist submission processing 400 is, for example, performed by a client (client machine). For example, the multi-group playlist submission process 400 can be performed by a submitter (e.g., media programmer) operating a media management application on client device.

The multi-group playlist submission process 400 initially creates 402 a multi-group playlist. Then, an on-line music store is access 404. One example of an on-line music store is the iTunes Music Store®. While accessing the on-line music store, a desired track for the multi-group playlist is located 406. Then, the desired track is dragged and dropped in the multi-group playlist.

A decision 410 then determines whether the tracks are to be reordered. When the decision 410 determines that the tracks of the multi-group playlist are to be reordered, the order of the tracks in the multi-group playlist is adjusted 412. In one implementation, the order of the tracks in the multi-group playlist can be adjusted 412 through a drag-and-drop operation. Alternatively, when the decision 410 determines that the tracks of the multi-group playlist are not be reordered, the block 412 is bypassed and a decision 414 determines whether a new group is to be added to the multi-group playlist. When the decision 414 determines that a new group is to be added, then a group indicator is inserted 416 into the multi-group playlist. Alternatively, when the decision 414 determines that a new group is not to be added, the block 416 is bypassed.

Next, a decision 418 determines whether the one or more groups of the multi-group playlist are to be reordered. Here, the groups being provided in the multi-group playlist can be reordered such that different tracks are in different groups. In any case, when the decision 418 determines that one or more groups are to be reordered, the order of the groups in the multi-group playlist is adjusted 420. Alternatively, when the decision 418 determines that none of the groups in the multi-group playlist are to be reorder, then the block 420 is bypassed.

A decision 422 then determines whether there are more tracks to be added to the multi-group playlist. When the decision 422 determines that a user does desired to add any additional tracks to the multi-group playlist, then the multi-group playlist submission process 400 returns to repeat the block 404 and subsequent blocks. On the other hand, when the decision 422 determines that no more additional tracks are to be added to the multi-group playlist, a decision 424 determines whether the multi-group playlist is to be submitted. When the decision 424 determines that the multi-group playlist is not be submitted, then the multi-group playlist submission process 400 returns to repeat the block 404 and subsequent operations so that additional changes can be made to the multi-group playlist.

In any event, once the decision 424 determines that the multi-group playlist is to be submitted, then the multi-group playlist is submitted 426 as a proposed multi-group playlist. Next, a request for authentication information is received 428. In response to the request for authentication information, authentication information is submitted 430. Next, a decision 432 determines whether the submitter is authenticated based on the authentication information submitted 430. When the decision 432 determines that the submitter is not authenticated, then the submitter is notified for 434 of the failed authentication. Following the block 434, the multi-group playlist submission process 400 returns to repeat the block 428 and subsequent blocks, thereby allowing the submitter to retry the authentication process.

On the other hand, when the decision 432 determines that the submitter has been authenticated, a validated multi-group playlist is received 436. The validated multi-group playlist is that portion of the proposed multi-group playlist that has been validated. Hence, the validated multi-group playlist may include less media assets then did the corresponding proposed multi-group playlist. Next, the validated multi-group playlist can be displayed for 438. Additionally, a descriptive information input screen can be displayed 440 for the multi-group playlist. Descriptive information for the multi-group playlist can then entered 442 using the descriptive information input screen. A decision 444 then determines whether the validated multi-group playlist together with the descriptive information are to be submitted. When the decision 444 determines that the validated multi-group playlist and the descriptive information therefore are not to be submitted, then the multi-group playlist submission process 400 returns to repeat the block 440 and subsequent blocks. In other implementations the multi-group playlist submission process 400 can instead returned to other areas, such as the block 404, so that the multi-group playlist can be re-engineered.

Nevertheless, when the decision 444 determines that the validated multi-group playlist together with the descriptive information therefore are to be submitted, the multi-group playlist with the descriptive information is submitted 446. Following the submission 446 of the multi-group playlist as well as the descriptive information, the multi-group playlist submission process 400 is complete and ends.

Figure 5A:
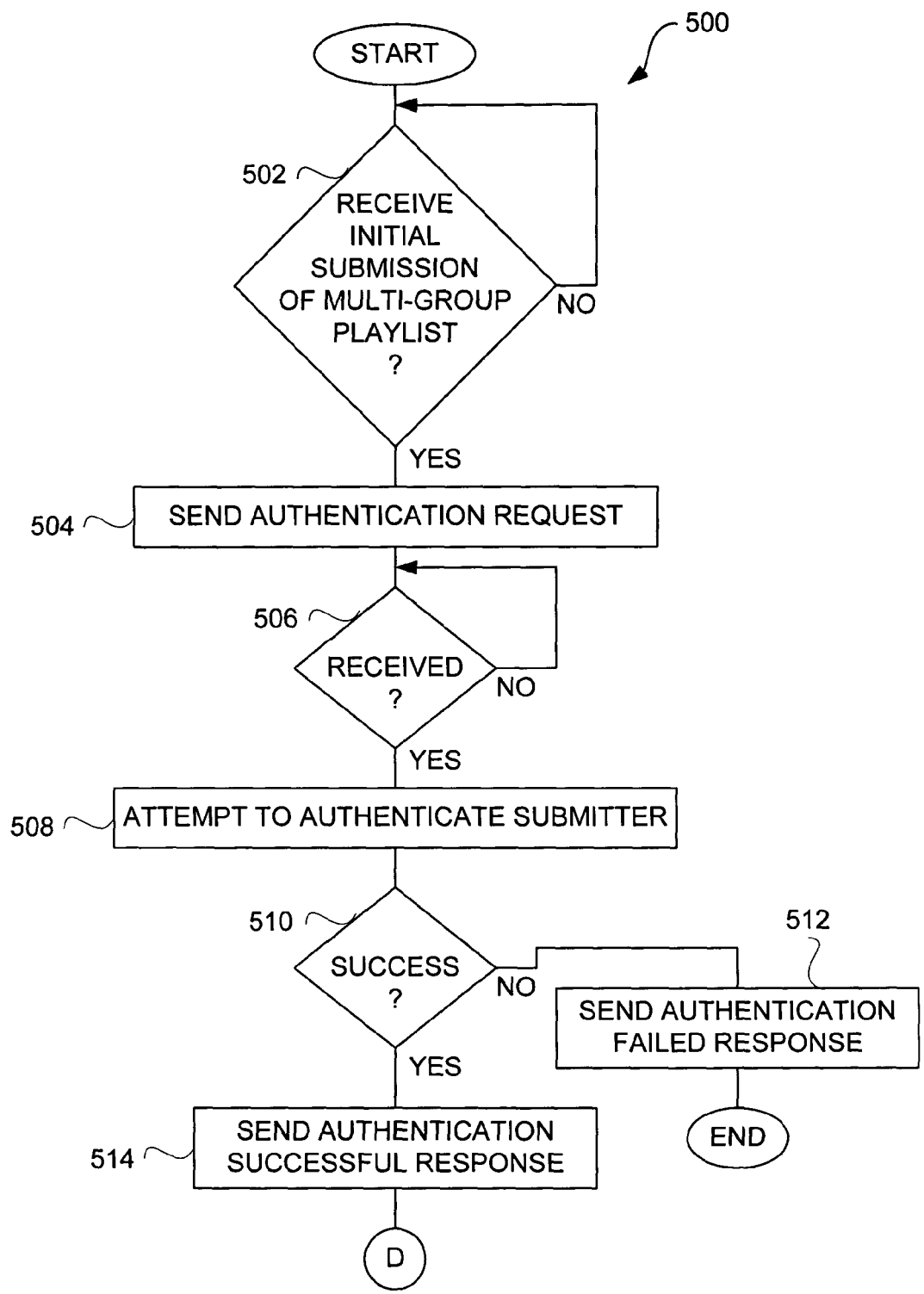
FIG. 5A-5C are flow diagrams of a multi-group playlist acceptance process according to one embodiment of the invention.
Figure 5B:
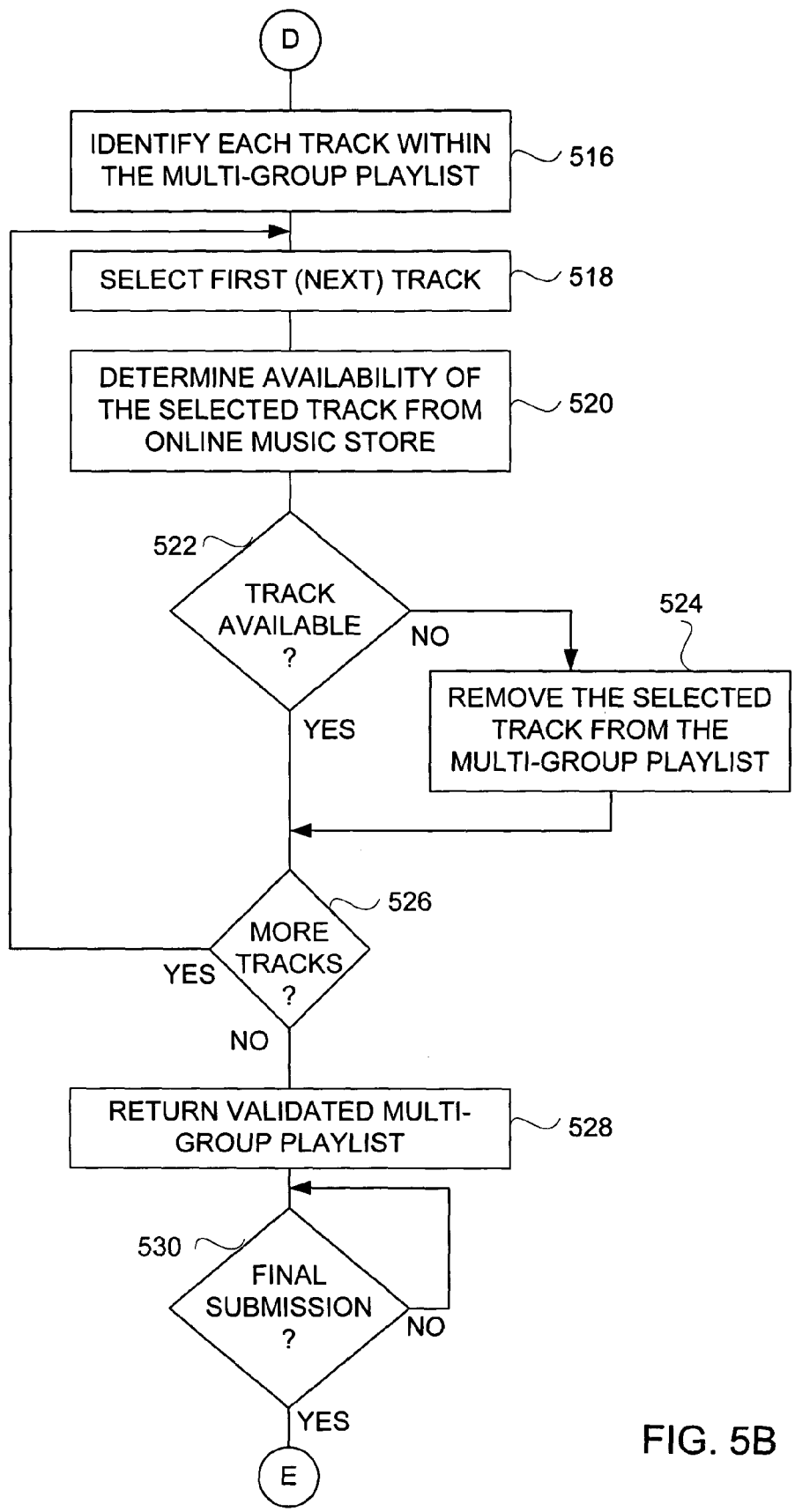
Figure 5C:
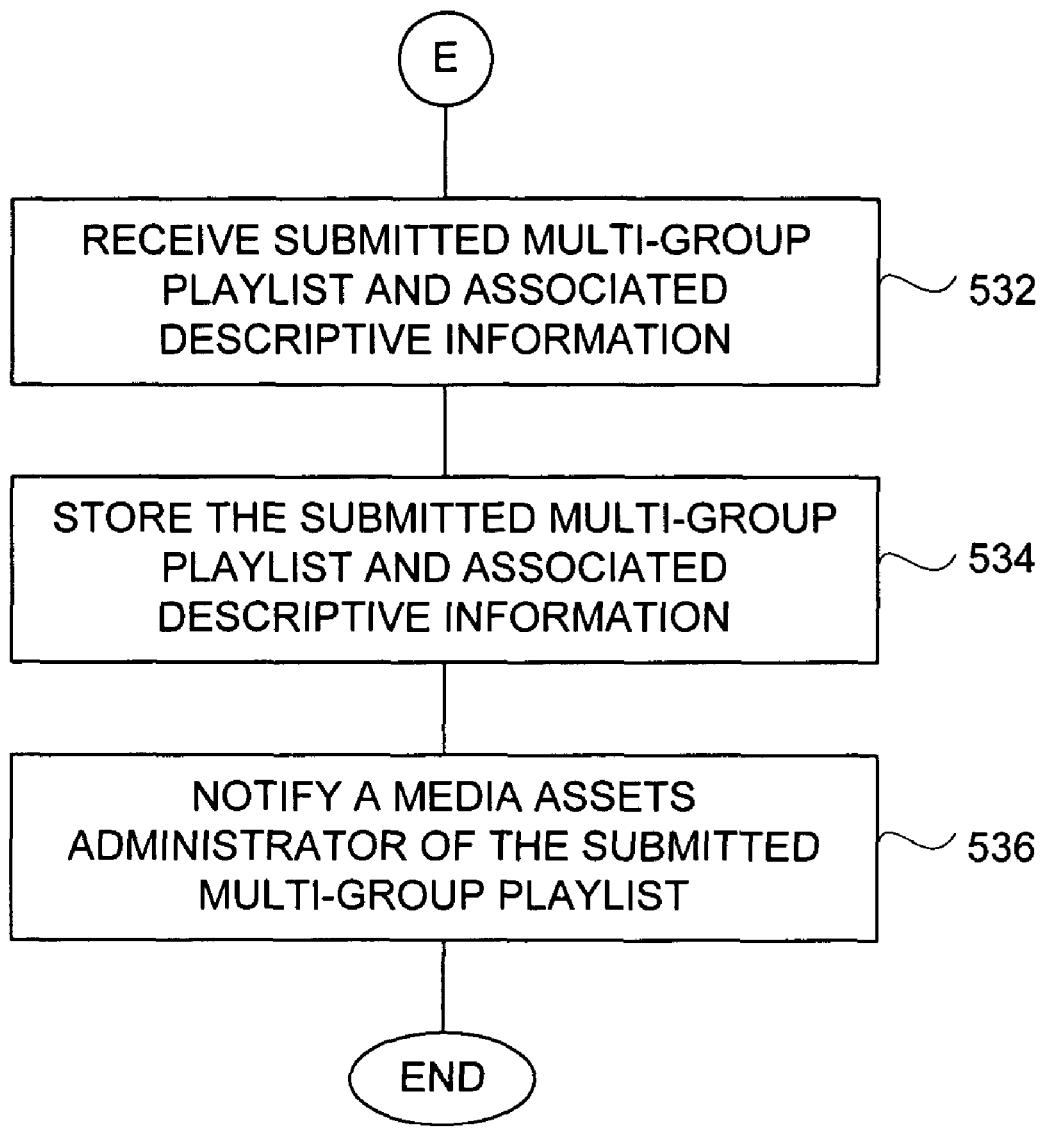

FIG. 5A-5C are flow diagrams of a multi-group playlist acceptance process 500 according to one embodiment of the invention. The multi-group playlist acceptance process 500 is, for example, performed by a digital media manager, such as the digital media manager illustrated in FIG. 1.

The multi-group playlist acceptance process 500 begins with a decision 502. The decision 502 determines whether an initial submission of the multi-group playlist has been received. When the decision 502 determines that an initial submission of a multi-group playlist has not been received, the multi-group playlist acceptance process 500 awaits such a submission. On the other hand, once the decision 502 determines that an initial submission of a multi-group playlist has been received, the multicast group playlist acceptance process 500 continues. In other words, the multi-group playlist acceptance process 500 is effectively invoked when an initial submission of a multi-group playlist is received.

Once the multi-group playlist acceptance process 500 continues, an authentication request is sent 504 to the corresponding client device of the submitter of the multi-group playlist. A decision 506 then determines whether an authentication response has been received. When the decision 506 determines that an authentication response has not yet been received, the multi-group playlist acceptance process 500 awaits such a response. Once the decision 506 determines that an authentication response has been received, authentication of the submitter is attempted 508. A decision 510 then determines whether the authentication was successful. When the decision 510 determines that the authentication of the submitter was unsuccessful, then an authentication failed response is sent 512 to the client machine associated with the submitter and the multi-group playlist acceptance process 500 ends.

Alternatively, when the decision 510 determines that the submitter has been authenticated, an authentication successful response is sent 514 to the client device associated with the submitter. The multicast group playlist is now validated. In particular, each track within the multi-group playlist is identified 516. Then, a first track of the tracks is selected 518. The availability of the selected track is then determines 520 from an on-line music store. For example, the on-line music store can refer to the music store server illustrated in FIG. 1 or the media assets database illustrated in FIG. 1. A decision 522 can then determine whether the selected track is available from the on-line music store. The availability can refer to physical availability or legal availability, or both. When the decision 522 determines that the selected track is not available, the selected track is removed 524 from the multi-group playlist. Alternatively, when the decision 522 determines that the selected track is available from the on-line music store, the block 524 is bypassed, such that the selected track remains within the multi-group playlist because its availability has been validated.

Next, a decision 526 determines whether there are more tracks within the multi-group playlist to be processed. When the decision 526 determines that there are more tracks in the multi-group playlist be processed, the multi-group playlist acceptance process 500 returns to repeat the block 518 to select and process to validate a next track in a similar manner. On the other hand, when the decision 526 determines that there are no more tracks in the multi-group playlist to be processed, a validated multi-group playlist is return 528 to the client device associated with the submitter. The validated multi-group playlist includes only those tracks from the initially submitted multi-group playlist that were validated. If all of the tracks from the initially submitted multi-group playlist were validated, the validated multi-group playlist and initially submitted multi-group playlist would include the same tracks. However, to the extent certain of the tracks from the initially submitted multi-group playlist were not able to be validated, the validated multi-group playlist would not include such tracks.

Thereafter, a decision 530 determines whether a final submission of the multi-group playlist has been received. When the decision 530 determines that a final submission has not been received, the multi-group playlist acceptance process 500 awaits such a submission. Alternatively, when the decision 530 determines that a final submission of the multi-group playlist has been received, the submitted multi-group playlist and its associated descriptive information are received 532. The submitted multi-group playlist and the associated descriptive information can be stored 534. In one implementation, the multi-group playlist and the associated descriptive information can be stored in a media assets database such as the media assets database illustrated in FIG. 1. Further, a media assets administrator can be notified 536 of the submitted multi-group playlist. In one implementation, once the submitted multi-group playlist is stored 534 in the media assets database, final processing might involve quality review and final production steps that could be under the realm of the media assets administrator. Following the notification 536, if any, to a media assets administrator, the multi-group playlist acceptance process 500 ends.

It should be recognized that after the processing of the multi-group playlist acceptance process 500, the submitted multi-group playlist and any associated descriptive information can be rendered available on an on-line music store. For example, the selected multi-group playlist and its associated descriptive information can be made available to a music store server, such as the music store server shown in FIG. 1, that provides the on-line music store. However, in one implementation, prior to making the submitted multi-group playlist and its associated descriptive information available on the on-line music store, quality control and production review would typically be performed. Typically, the submitter's media programmers (e.g., music programmers) then develop the multi-group playlists. Hence, the ability to impose quality, content and production controls can be important to providing quality media content at the on-line music store.

Figure 6:
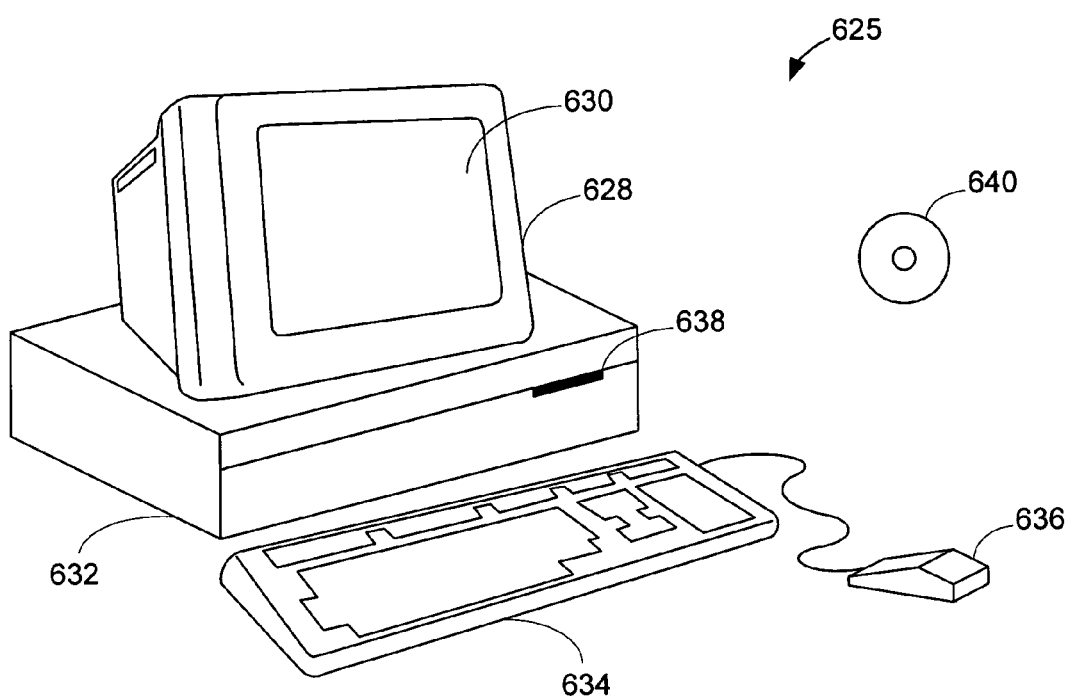
FIG. 6 shows an exemplary computer system suitable for use with the invention.

FIG. 6 shows an exemplary computer system 625 suitable for use with the invention. Computer system 625 includes a display monitor 628 having a single or multi-screen display 630 (or multiple displays), cabinet 632, keyboard 634, and mouse 636. Cabinet 632 houses a drive 638, such as a CD-ROM or floppy drive, system memory and a hard drive (not shown) which may be utilized to store and retrieve software programs incorporating computer code that implements some or all aspects of the invention, data for use with the invention, and the like. Although CD-ROM 640 is shown as an exemplary computer readable storage medium, other computer readable storage media including floppy disk, tape, flash memory, system memory, and hard drive may be utilized. In one implementation, an operating system for the computer system 625 is provided in the system memory, the hard drive, the CD-ROM 640 or other computer readable storage medium and serves to incorporate the computer code that implements some or all aspects of the invention.

Figure 7:
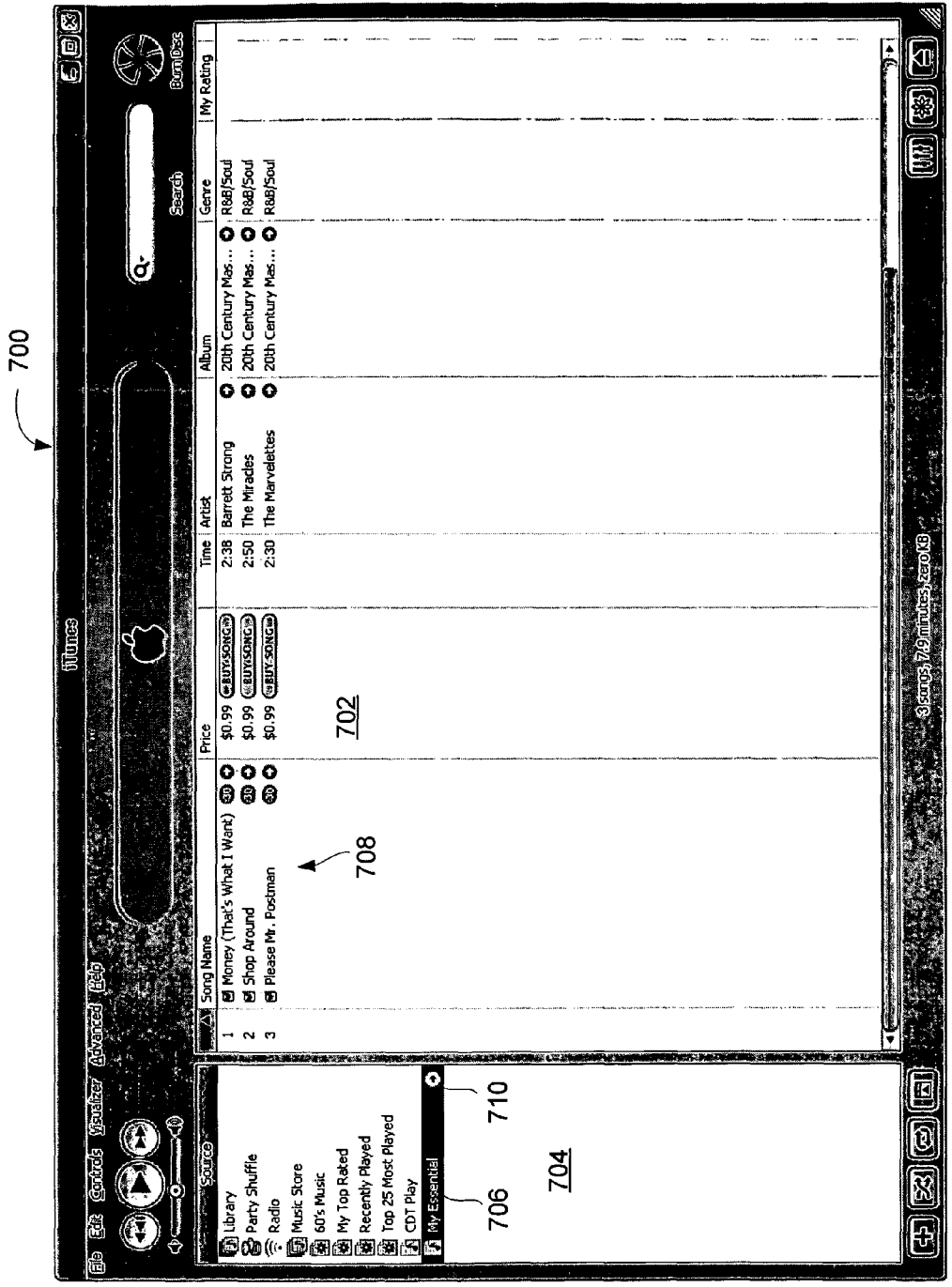
FIG. 7 is a screen shot of a playlist creation window according to one embodiment of the invention.

FIG. 7 is a screen shot of a playlist creation window 700 according to one embodiment of the invention. The playlist creation window 700 includes a playlist region 702 and a source region 704. The source region 704 list various media sources, including library, music store and various playlists. In particular, one media source in the source region 704 is a playlist designated by a title 706, namely, "My Essential". Within the playlist region 702, there is a list 708 of the media assets contained within the playlist entitled "My Essential". In this example, the media assets are songs and the list 708 includes three songs. For each of the songs listed in the playlist region 702, information regarding song name, price, time (duration), artist, album, genre and rating can be provided.

Figure 8:
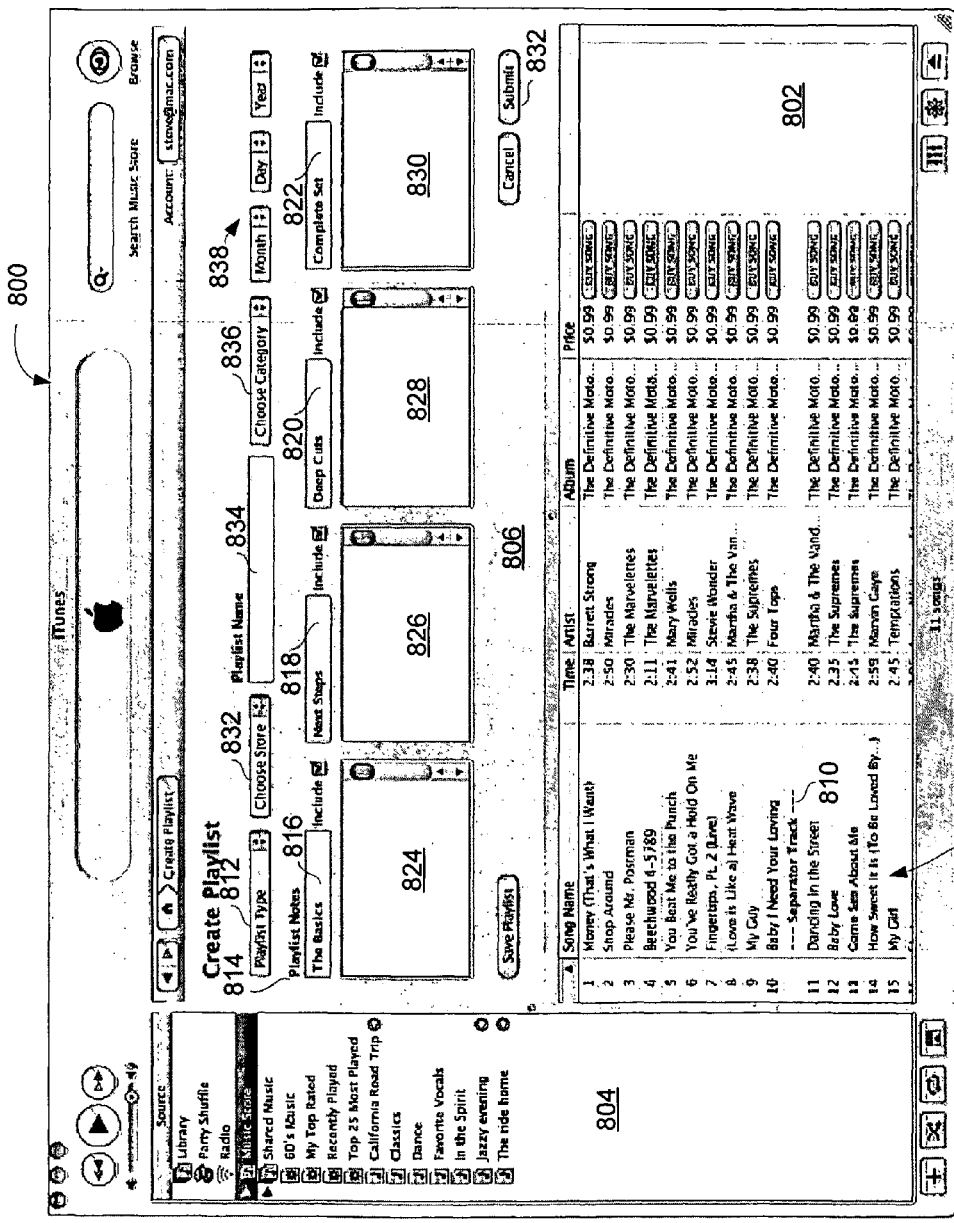
FIG. 8 is a screen shot of a multi-group playlist creation window according to one embodiment of the invention.

FIG. 8 is a screen shot of a multi-group playlist creation window 800 according to one embodiment of the invention. The multi-group playlist creation window 800 presents a graphical user interface that is used to assist a user (e.g., media programmer) in creating a playlist having multiple sub-groups. Typically, in one embodiment, the user would first create the playlist using the playlist creation window 700 as shown in FIG. 7. However, as shown in FIG. 7, the playlist creation window 700 indicates that there are three (3) audio tracks present in the playlist at that time. However, prior to interacting with the multi-group playlist creation window 800 illustrated in FIG. 8, the list of audio items within the playlist creation window 700 would include all the desired audio tracks for the multi-group playlist.

The multi-group playlist creation window 800 includes a track listing area 802, a source region 804, and a multi-group playlist information entry region 806. The track listing area 802 displays a list the audio tracks that are associated with the multi-group playlist being created. In the illustration depicted in FIG. 8, the list of media assets 808 represent four different sub-groups. However, it should be noted that only the first sub-group and part of the second sub-group are illustrated in FIG. 8. Each of the sub-groups are separated by use of a separator track 810. As shown in the track listing area 802, the positioning of the track separator 810 between audio tracks 10 and 11 serves to separate those audio tracks in a first sub-group and those audio tracks in a second sub-group. Hence, the first sub-group of the multi-group playlist includes audio tracks 1 through 10, and the audio tracks for the second sub-group began at audio track 11.

Additionally, the multi-group playlist information entry region 806 is used to enable a user to enter information pertaining to the multi-group playlist. In this embodiment, the information pertaining to the multi-group playlist includes various aspects. A user can select a playlist type at a select box 812. Examples of the playlist types include artist, genre or theme. The user can also enter playlist notes 814 for each of the sub-groups with in the multi-group playlist. In this example, the playlist notes 814 include text boxes 816, 818, 820 and 822 for entering a label or title for the first sub-group, the second sub-group, the third sub-group 820 and the fourth sub-group, respectively. As shown in FIG. 8, titles or labels in each of the text boxes 816-822 can be provided for each of the sub-groups can default to "The Basics", "Next Steps", "Deep Cuts" and "Complete Set", respectively.

Moreover, for each of the sub-groups, the multi-group playlist creation window 806 also respectively includes a text boxes 824-830. The user can enter descriptive information into the text boxes 824-830 for any of the sub-groups. Typically, the descriptive information entered into the text boxes 824-830 would describe the nature, characteristics, history or thought behind of the associated sub-group of audio tracks. Still further, the multi-group playlist creation window 806 includes a submit button 832. After the user has reviewed the audio tracks and their groupings in the track listing area 802, made selections with the various select boxes and entered text into the various text boxes, the user can complete the playlist creation process by selecting the submit button 832. On selection of the submit button 832, the multi-group playlist that has been created is sent to a digital media manager for subsequent processing prior to making the multi-group playlist available for on-line purchase.

Figure 9:
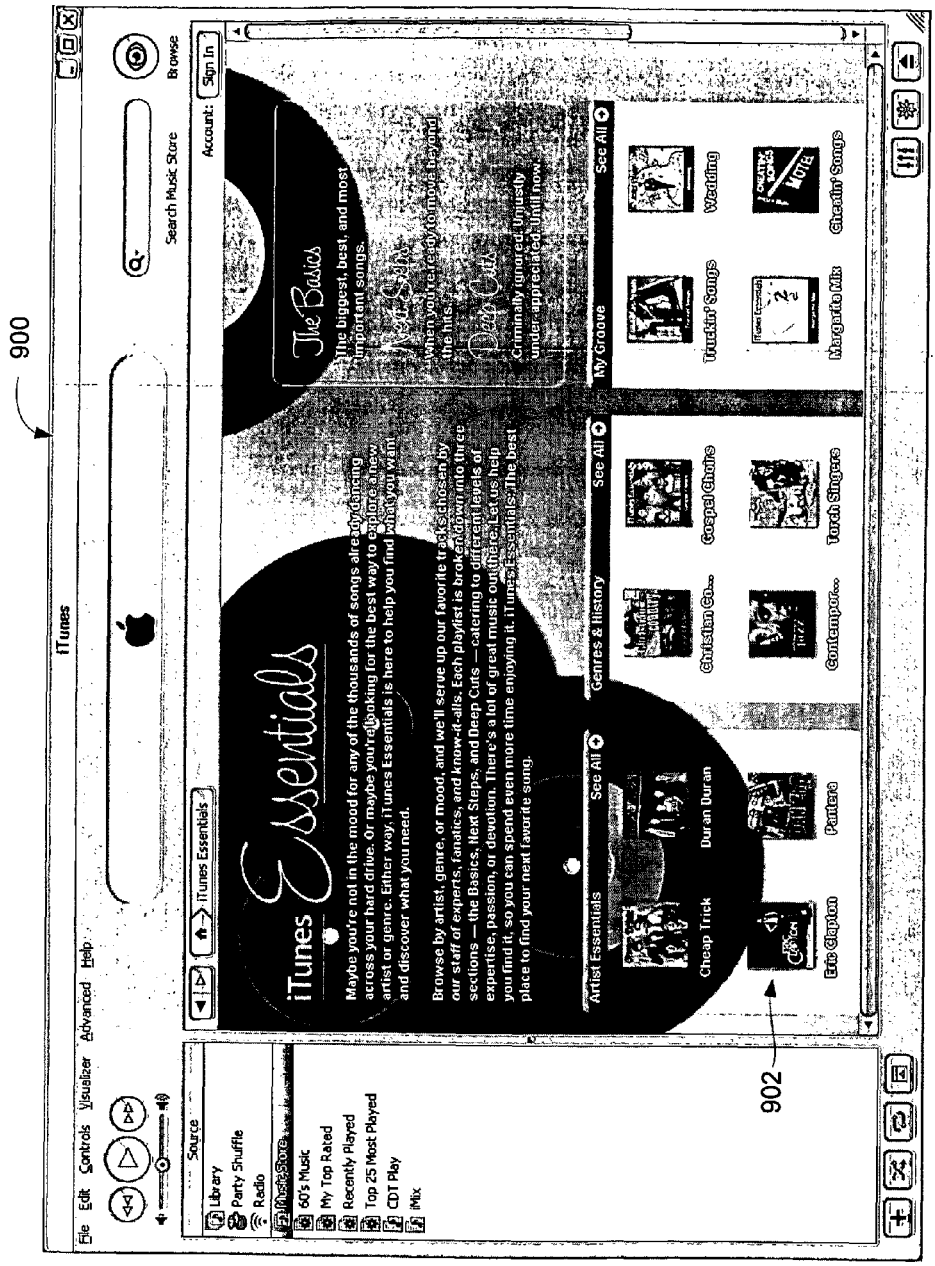
FIG. 9 is a screen shot of a playlist directory window according to one embodiment of the invention.

FIG. 9 is a screen shot of a playlist directory window 900 according to one embodiment of the invention. As in example, in this embodiment, the playlists which can be browsed by a user on-line can be referred to as "iEssentials" which signify important audio track (e.g., songs) for an artist, genre or theme. As shown in FIG. 9, the iEssential playlists can be grouped by their playlist type. One playlist type pertains to artists ("Artist Essentials"), another playlist type pertains to genre ("Genre & History"), and in other type pertains to themes ("My Groove"). For example, in browsing the playlists, a user might select the particular playlist 902 identified as "Eric Clapton", which is provided under the "Artist Essentials" playlist type.

Figure 10A:
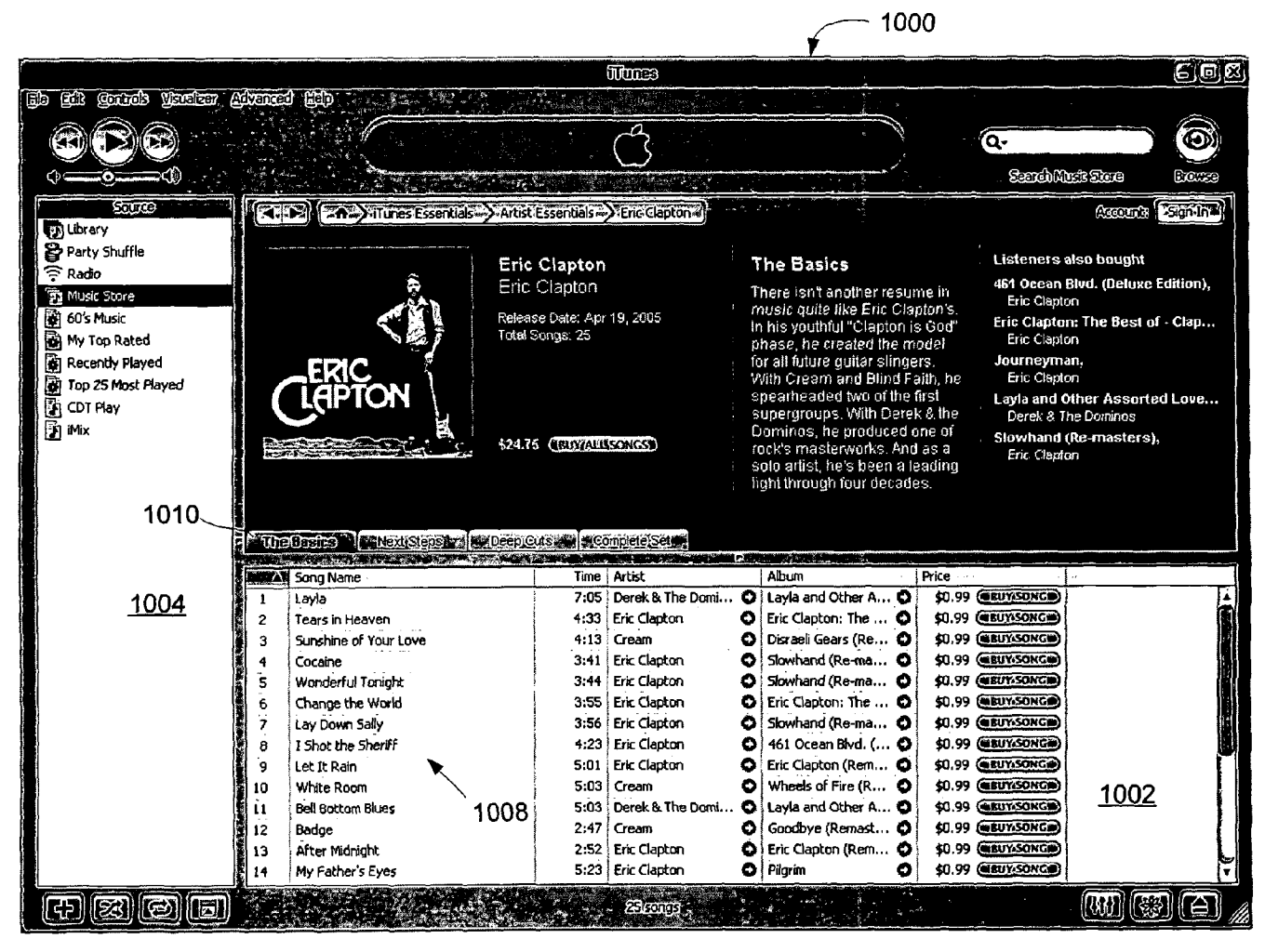
Figure 10B:
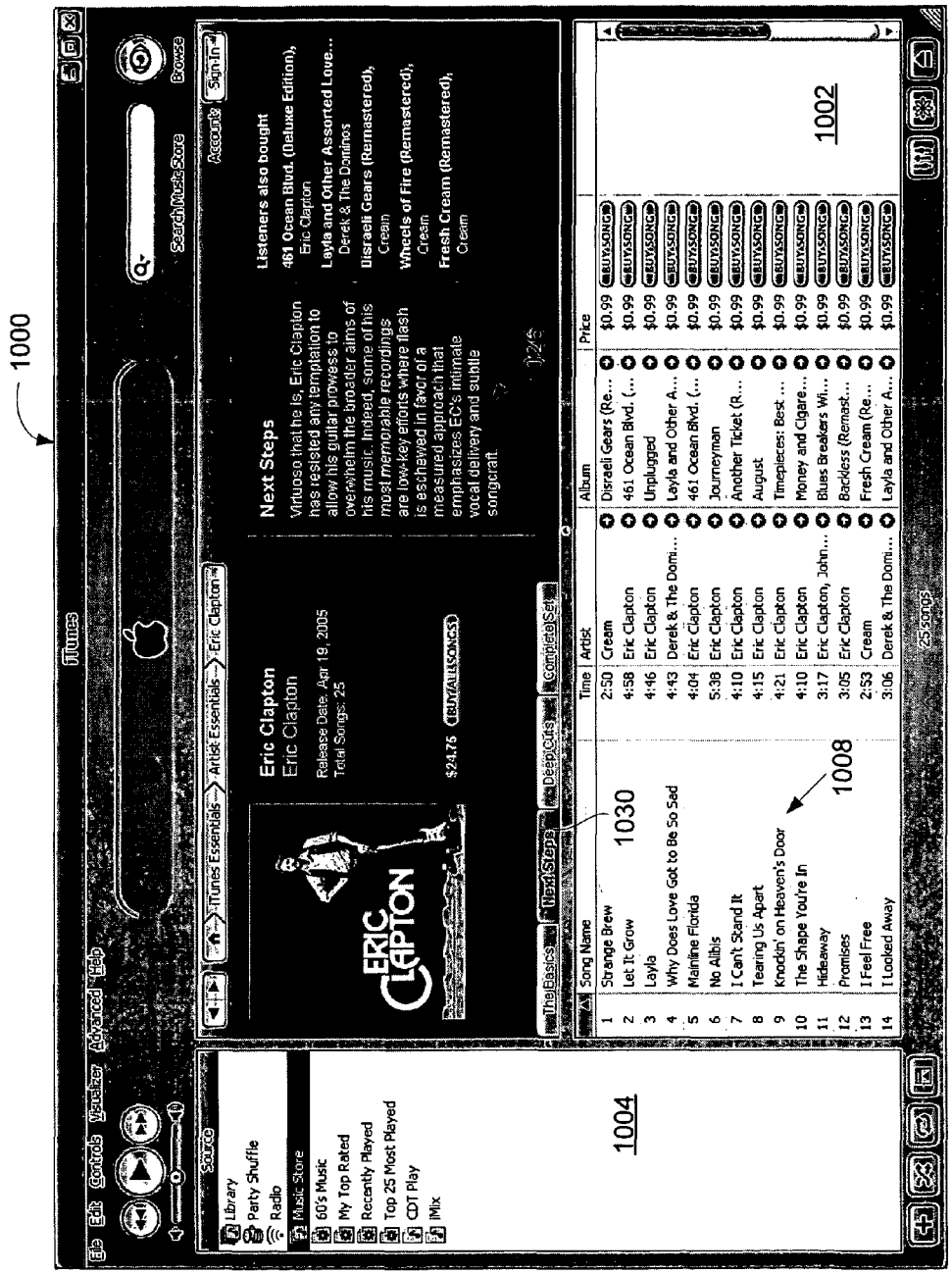

FIGS. 10A-10D are screen shots pertaining to a multi-group playlist display window 1000 according to one embodiment of the invention. In this example, the playlist pertains to the popular artist Eric Clapton, and the playlist has audio tracks arranged into three (4) sub-groups and one complete group. The multi-group playlist display window 1000 includes a track listing area 1002, a source region 1004, and a playlist information region 1006. The track listing area 1002 displays a list 1008 of audio tracks that are associated with the multi-group playlist being presented by the multi-group playlist display window 1000. More particularly, the list 1008 of audio tracks within the track listing area 1002 pertain to one of the sub-groups/groups of the multi-group playlist. In FIG. 10A, a first group tab 1010 indicates that the first sub-group is being displayed. In this example, the label or title for the first sub-group is displayed on the first group tab 1010 as "The Basics". The playlist information region 1006 contains a title or label 1012 for the multi-group playlist, an artist indication 1014 (which can serve as a link to an artist page on the music store), a release date indication 1016, a number of total songs indication 1018, a graphical image 1020 (e.g., artwork) associated with the multi-group playlist, a buy button 1024, descriptive information 1026 for the particular sub-group of the multi-group playlist being displayed, and affiliated items information 1028 (such as other audio tracks other users also tend buy). Selection of the buy button 1024 initiates purchase of all the song in the sub-group/group to be purchased from the on-line music store. In FIG. 10A, the first sub-group of the multi-group playlist includes twenty-five (25) songs; hence, selection of the buy button 1024 initiates purchase of the twenty-five songs of the first sub-group.

In FIG. 10B, a second group tab 1030 indicates that the second sub-group is being displayed. In this example, the label or title for the second sub-group is displayed on the second group tab 1030 can as "Next Steps". The list 1008 of audio tracks being displayed in the track listing area now correspond to the second sub-group. In FIG. 10B, the second sub-group of the multi-group playlist includes twenty-five (25) songs; hence, selection of the buy button 1024 initiates purchase of the twenty-five songs of the second sub-group. Note also, that the descriptive information 1026 for the particular sub-group also changes as the selected sub-group changes.

Figure 10C:
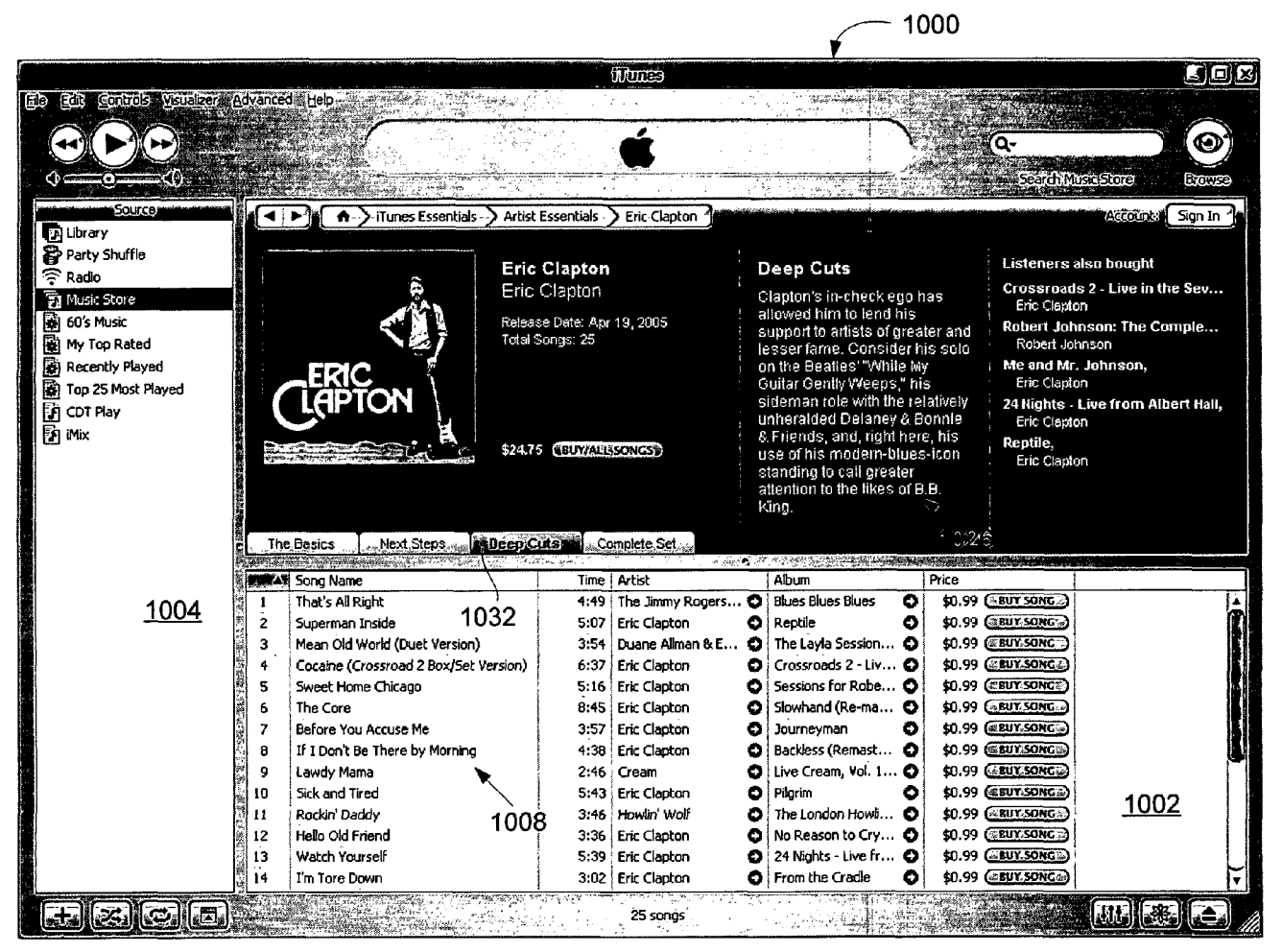

In FIG. 10C, a third group tab 1032 indicates that the third sub-group is being displayed. In this example, the label or title for the third sub-group is displayed on the third group tab 1032 can as "Deep Cuts". The list 1008 of audio tracks being displayed in the track listing area now correspond to the third sub-group. In FIG. 10C, the third sub-group of the multi-group playlist includes twenty-five (25) songs; hence, selection of the buy button 1024 initiates purchase of the twenty-five songs of the first sub-group.

Figure 10D:
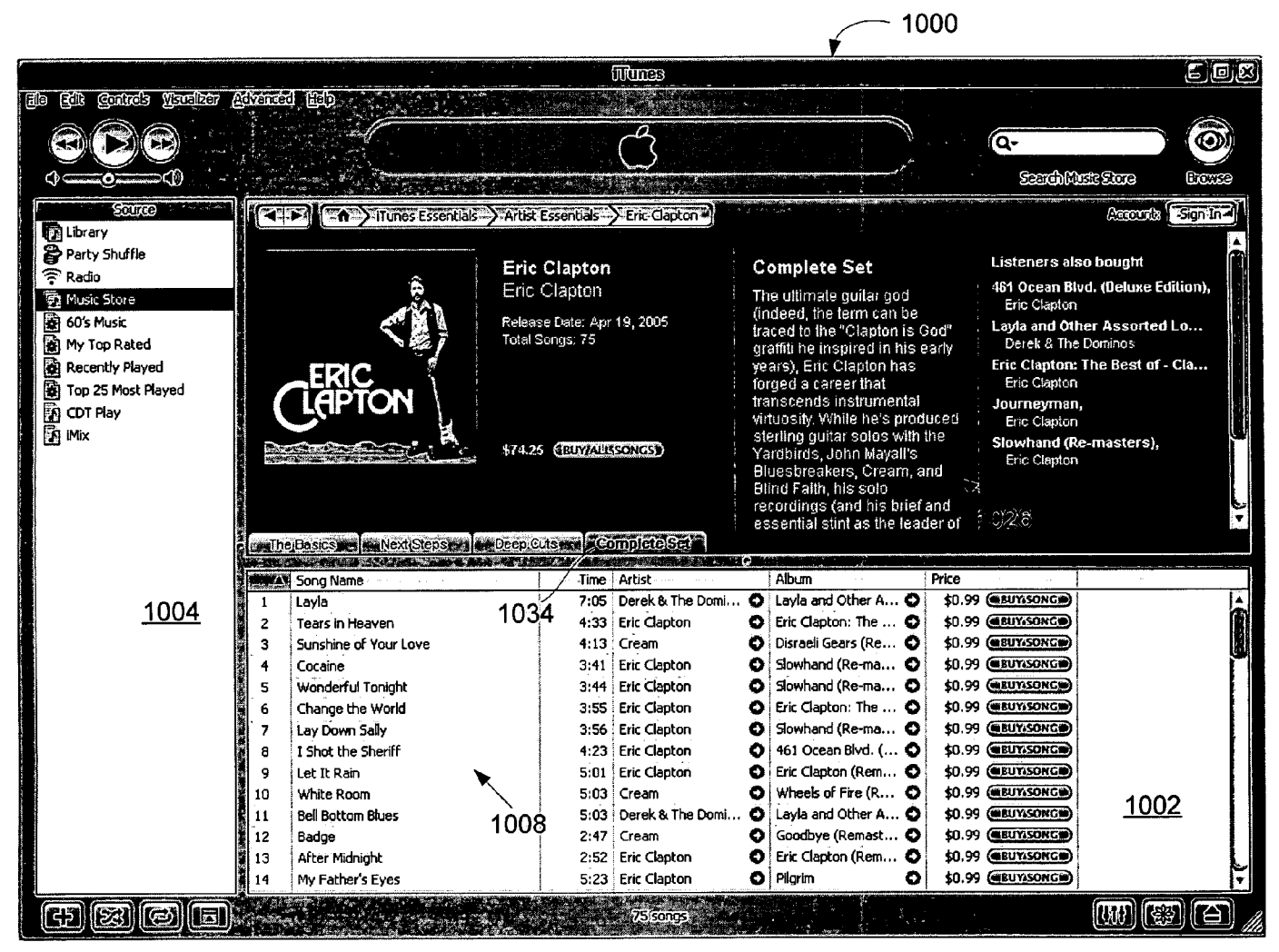

In FIG. 10D, a fourth sub-group tab 1034 indicates that the compete group is being displayed. In this example, the label or title for the complete group is displayed on the fourth group tab 1032 can as "Complete Set". The list 1008 of audio tracks being displayed in the track listing area now correspond to all the audio tracks from the first, second and third sub-groups. In FIG. 10D, the complete group of the multi-group playlist includes seventy-five (75) songs; hence, selection of the buy button 1024 initiates purchase of the seventy-five songs of the complete group.

Although FIGS. 7-10D are with reference to audio tracks, namely songs, it should be understood that the invention is generally applicable to media assets.

Although the media assets (or media items) of emphasis in several of the above embodiments were audio items (e.g., audio files or audio tracks), the media assets are not limited to audio items. For example, the media assets can alternatively pertain to videos (e.g., movies) or images (e.g., photos). Also, in one implementation, the audio files or audio tracks can pertain to songs or audiobooks.

The various aspects, embodiments, implementations or features of the invention can be used separately or in any combination.

The invention is preferably implemented by software, but can also be implemented in hardware or a combination of hardware and software. The invention can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, and optical data storage devices. The computer readable medium can also be distributed over network-coupled computer systems so that the computer readable code is stored and executed in a distributed fashion.

The advantages of the invention are numerous. Different aspects, embodiments or implementations may yield one or more of the following advantages. One advantage of the invention is that media asset groups can be created with greater ease and with more uniformity. As a result, users (even music professionals) are able to create and submit media assets groups with greater ease and reliability. Another advantage of the invention is that processing of submitted media assets groups can be processed substantially more efficiently (including with greater automation). Consequently, media assets groups can be more readily available on on-line media stores. Still another advantage of the invention is that media asset groups with multiple groupings (e.g., sub-groups) can be created and published. The media asset groups with multiple groupings can thereafter be browsed and purchased, whereby the multiple groupings serve as additional guidance to potential on-line purchasers.

The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A method for creating a group of media assets to be made available on an on-line media asset store, said method comprising:
 (a) interacting, at a client, with the on-line media asset store to create a particular group of media assets, the particular group of media assets having a plurality of media assets, the plurality of media assets of the particular group of media assets being presented in a track listing at the client;
 (b) interposing one or more sub-group indicators in the already displayed track listing for the particular group of media assets to designate a plurality of sub-groups within the particular group of media assets, wherein the one or more sub-group indicators are separator tracks that are presented in the track listing for the particular group of media assets to separate the media assets in the particular group of media assets into different ones of the sub-groups;
 (c) providing, at the client, descriptive information for the particular group of media assets; and
 (d) submitting the particular group of media assets with its descriptive information to the on-line media asset store so as to be made available to others via the on-line media asset store.

2. A method as recited in claim 1, wherein the descriptive information includes text describing the sub-groups.

3. A method as recited in claim 2, wherein the text describing the sub-groups includes one or more labels for the sub-groups.

4. A method as recited in claim 3, wherein the media assets within each of the sub-groups are arranged in an order.

5. A method as recited in claim 1, wherein the media assets within each of the sub-groups are arranged in an order.

6. A method as recited in claim 1, wherein the media assets are audio tracks, and wherein the particular group of media assets is a playlist of at least the audio tracks.

7. A method as recited in claim 1, wherein the media assets within at least two of the sub-groups are mutually exclusive from each other.

8. A method as recited in claim 7, wherein the media assets within another of the sub-groups are all the media assets from each of the other sub-groups.

9. A method as recited in claim 1,
wherein prior to said submitting (d), said method further comprises:
sending the particular group of media assets to a digital asset manager for validation;
receiving a validated version of the particular group of media assets from the digital asset manager; and
displaying the validated version of the particular group of media assets,
wherein said submitting (d) submits the validated version of the particular group of media assets.

10. A method as recited in claim 1,
wherein prior to said submitting (d), said method further comprises:
sending the particular group of media assets to a digital asset manager for validation;
receiving a validated version of the particular group of media assets from the digital asset manager;
displaying the validated version of the particular group of media assets; and
determining whether the validated version of the particular group of media assets is accepted,
wherein said submitting (d) at least informs the digital asset manager of acceptance of the validated version of the particular group of media assets.

11. A graphical user interface for assisting a user to locate media assets of interest from an on-line media store, said graphical user interface comprising:
a window displayed on a display device associated with a computing device, said window concurrently including at least a first sub-window and a second sub-window,
wherein said first sub-window displays information pertaining to a group of media assets,
wherein said second sub-window displays a list of at least a portion of the media assets in the group of media assets,
wherein said first sub-window includes a buy all button for the group of media assets, and the selection of the buy all button for the group of media assets initiates purchase of all the media assets within the list,
wherein said window further comprises a plurality of user-selectable display elements, each of the user-selectable display elements is associated with a different one of a plurality of sub-groups for the group of media assets,
wherein the group of media assets includes a plurality of sub-groups,
wherein on selection of a first of the user-selectable display elements, the list displayed in said second sub-window includes those of the media assets that are part of a first of the sub-groups of the group of media assets, and
wherein on selection of a second of the user-selectable display elements, the list displayed in said second sub-window includes those of the media assets that are part of a second of the sub-groups of the group of media assets.

12. A graphical user interface as recited in claim 11, wherein the selection of the buy all button for the group of media assets causes one-click purchase of all the media assets within the list.

13. A graphical user interface as recited in claim 11, wherein the group of media assets is a playlist, and wherein the information displayed in said first sub-window includes descriptive information about the playlist.

14. A graphical user interface as recited in claim 13, wherein the descriptive information displayed in said first sub-window includes a graphical image associated with the playlist.

15. A graphical user interface as recited in claim 13, wherein the descriptive information displayed in said first sub-window includes an artist indication for an artist associated with the playlist and a hyperlink to additional information pertaining to the artist.

16. A graphical user interface as recited in claim 13, wherein the descriptive information displayed in said first sub-window includes a theme indication for a theme associated with the playlist.

17. A graphical user interface as recited in claim 13, wherein the descriptive information displayed in said first sub-window includes a genre indication for a genre associated with the playlist.

18. A graphical user interface as recited in claim 13, wherein the descriptive information displayed in said first sub-window includes a release date for the playlist and a number of media assets in the playlist.

19. A graphical user interface as recited in claim 13, wherein the media assets in the playlist are audio tracks for songs.

20. A graphical user interface as recited in claim 11, wherein the list includes a buy button for each of the media assets in the group of media assets, the buy button allowing for one-click purchase of the associated media asset.

21. A graphical user interface as recited in claim 11, wherein said first sub-window uses hyperlinks to access related media assets, and wherein said second sub-window uses a table or a row and column format to display the list of the media assets in the group of media assets.

22. A graphical user interface as recited in claim 11, wherein the first information is descriptive information pertaining to media items.

23. A graphical user interface as recited in claim 18, wherein the list further includes a specific item hyperlink presented for each of the media assets being listed in the group of media assets.

24. A graphical user interface as recited in claim 11, wherein said window further includes a source window that is concurrently displayed with said first sub-window and said second sub-window.

25. A graphical user interface as recited in claim 11, wherein the media assets that are part of the second of the sub-groups of the group of media assets are completely different than the media assets that are part of the first of the sub-groups of the group of media assets.

26. A graphical user interface as recited in claim 11, wherein on selection of a third of the user-selectable display elements, the list displayed in said second sub-window includes all the media assets that are part of the group of media assets.

27. A graphical user interface for assisting a user to locate media assets of interest from an on-line media store, said graphical user interface comprising:
a window displayed on a display device associated with a computing device, said window concurrently including at least a first sub-window and a second sub-window,
wherein said first sub-window displays information pertaining to a group of media assets,
wherein said second sub-window displays a list of at least a portion of the media assets in the group of media assets,
wherein the group of media items includes a plurality of sub-groupings, and
wherein, on selection of a different one of the sub-groupings, displaying in the second sub-window, the media assets in the group of media assets that are associated with the selected sub-groupings without display other of the media assets in the group of media assets that are associated with other of the sub-groupings.

28. A graphical user interface for assisting a user in making a media asset group having a plurality of media assets available on an on-line media store, said graphical user interface comprising:
: a window displayed on a display device associated with a computing device, said window concurrently including at least a first sub-window and a second sub-window,
: wherein said first sub-window displays a plurality of user interface components that enable the user to enter information pertaining to the media asset group,
: wherein said second sub-window displays a list of at least a portion of the media assets in the media asset group, and
: wherein the list of at least a portion of the media assets in the group of media assets includes a least one separator track to distinguish tracks between different sub-groups, the at least one separator track being user-positionable within the list.

29. A graphical user interface as recited in claim 28, wherein the media asset group includes a plurality of sub-groups.

30. A graphical user interface as recited in claim 29, wherein the user interface components for said first sub-window are provided separately for each of the sub-groups.

31. A graphical user interface as recited in claim 30, wherein the user interface components enable the user to enter a name for each of the sub-groups, and a textual description for each of the sub-groups.

32. A graphical user interface as recited in claim 28,
: wherein the media asset group includes a plurality of sub-groups and a complete group,
: wherein the user interface components for said first sub-window are provided separately for each of the sub-groups as well as for the complete group, and
: wherein the user interface components enable the user to enter a name for each of the sub-groups and the complete group, and a textual description for each of the sub-groups and the complete group.

33. A computer readable medium including at least computer program code tangibly stored therein for creating a multi-group playlist of media assets to be made available on an on-line media asset store, said computer readable medium comprising:
: computer program code for interacting with the on-line media asset store to create and display a multi-group playlist, the multi-group playlist specifying a plurality of media assets;
: computer program code for interposing one or more sub-group indicators in the multi-group playlist being displayed to designate a plurality of sub-groups within the multi-group playlist, wherein the one or more sub-group indicators are presented between tracks provided in the multi-group playlist to separate the media assets in the multi-group playlist into different ones of the sub-groups;
: computer program code for receiving descriptive information for the multi-group playlist; and
: computer program code for submitting the multi-group playlist with its descriptive information to the on-line media asset store so as to be made available to others via the on-line media asset store.

34. A computer readable medium as recited in claim 33, wherein said computer readable medium comprises:
: computer program code for displaying the multi-group playlist available and retrieved from the on-line media asset store such that each of the groups of the multi-group playlist can be selectively displayed wherein a displayed track listing includes only those of the media assets that are associated with the selected group.

35. A computer readable medium as recited in claim 34, wherein when the multi-group playlist available and retrieved from the on-line media asset store is displayed, the one or more sub-group indicators previously interposed in the multi-group playlist are not displayed.

36. A method as recited in claim 1, wherein said method comprises:
: subsequently displaying the particular group of media assets available and retrieved from the on-line media asset store such that each of the sub-groups of the particular group of media assets can be selectively displayed wherein a displayed track listing includes only those of the media assets that are associated with the selected sub-group.

37. A method as recited in claim 36, wherein when the particular group of media assets available and retrieved from the on-line media asset store is displayed, the one or more sub-group indicators previously interposed are not displayed.

* * * * *

UNITED STATES PATENT AND TRADEMARK OFFICE
CERTIFICATE OF CORRECTION

| | | |
|---|---|---|
| PATENT NO. | : 7,860,830 B2 | Page 1 of 1 |
| APPLICATION NO. | : 11/115090 | |
| DATED | : December 28, 2010 | |
| INVENTOR(S) | : Payam Mirrashidi et al. | |

It is certified that error appears in the above-identified patent and that said Letters Patent is hereby corrected as shown below:

On Title Pg. 3, Item (56) in column 1, under "Other Publications", line 28, delete "Columist" and insert -- Columnist --, therefor.

On Title Pg. 4, Item (56) in column 2, under "Other Publications", line 18, delete "Internew" and insert -- Internet --, therefor.

In column 7, line 46, delete "PostScript®"" and insert -- PostScript®) --, therefor.

In column 12, line 6, delete "with in" and insert -- within --, therefor.

Signed and Sealed this
Twenty-fifth Day of October, 2011

David J. Kappos
*Director of the United States Patent and Trademark Office*